(12) United States Patent
Toyama et al.

(10) Patent No.: US 8,553,136 B2
(45) Date of Patent: Oct. 8, 2013

(54) CAMERA SYSTEM

(71) Applicant: Olympus Imaging Corp., Tokyo (JP)

(72) Inventors: Mitsuru Toyama, Hidaka (JP); Takeshi Ito, Hino (JP); Tamotsu Koiwai, Akiruno (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/759,767

(22) Filed: Feb. 5, 2013

(65) Prior Publication Data

US 2013/0148007 A1 Jun. 13, 2013

Related U.S. Application Data

(63) Continuation of application No. PCT/JP2012/060444, filed on Apr. 18, 2012.

(30) Foreign Application Priority Data

Jun. 24, 2011 (JP) ................................. 2011-140802

(51) Int. Cl.
*G03B 13/00* (2006.01)
(52) U.S. Cl.
USPC .............. 348/345; 396/104; 396/85; 396/360
(58) Field of Classification Search
USPC ............................. 348/348, 349; 396/104, 85
See application file for complete search history.

(56) References Cited

U.S. PATENT DOCUMENTS

| | | | |
|---|---|---|---|
| 4,490,018 A * | 12/1984 | Yokotsuka | 359/702 |
| 5,164,860 A | 11/1992 | Suzuki et al. | |
| 5,815,748 A * | 9/1998 | Hamamura et al. | 396/104 |
| 5,918,078 A | 6/1999 | Imura et al. | |
| 6,912,096 B2 * | 6/2005 | Terada | 359/694 |

FOREIGN PATENT DOCUMENTS

| | | |
|---|---|---|
| JP | 03-236008 | 10/1991 |
| JP | 06-011643 | 1/1994 |
| JP | 06-265771 | 9/1994 |
| JP | 10-082944 | 3/1998 |
| JP | 2010-002823 | 1/2010 |
| JP | 2011-090023 | 5/2011 |

OTHER PUBLICATIONS

Office Action for Japanese Patent Application No. 2012-530817, mailed Sep. 4, 2012 (3 pgs.) with translation (3 pgs.).
PCT/ISA/210, "International Search Report" for PCT/JP2012/060444, mailed Jun. 12, 2012 (2 pgs.) with translation (2 pgs.).

* cited by examiner

*Primary Examiner* — Tuan Ho
*Assistant Examiner* — Fayez Bhuiyan
(74) *Attorney, Agent, or Firm* — John C. Pokotylo; Straub & Pokotylo

(57) ABSTRACT

A camera system of this invention includes: a fixed member; a focusing lens; a drive portion that drives the focusing lens; a rotational member to be engaged; an operation ring that can be positioned at a first position and a second position in the optical axis direction; an engagement portion that, when the operation ring is at the second position, causes the rotational member to be engaged and the operation ring to engage with each other; and a control portion that, when the operation ring is at the first position and the operation ring is rotated, drives the focusing lens in accordance with the rotation, and when the operation ring is at the second position, drives the focusing lens in accordance with a relative movement position between the rotational member to be engaged and the fixed member.

7 Claims, 15 Drawing Sheets

| POSITION IN OPTICAL AXIS DIRECTION OF OPERATION RING / SELECTED FOCUS OPERATION MODE | FIRST POSITION | SECOND POSITION |
|---|---|---|
| MANUAL FOCUS MODE | MANUAL FOCUS OPERATION (FOCUSING LENS MOVES IN ACCORDANCE WITH ROTATION OF OPERATION RING) | DISTANCE-SPECIFICATION FOCUS OPERATION (FOCUSING LENS MOVES IN ACCORDANCE WITH DISPLAY OF DISTANCE SCALE) |
| AUTOFOCUS MODE | AUTOFOCUS OPERATION (FOCUSING LENS DOES NOT MOVE EVEN IF OPERATION RING ROTATES) | DISTANCE-SPECIFICATION FOCUS OPERATION (FOCUSING LENS MOVES IN ACCORDANCE WITH DISPLAY OF DISTANCE SCALE) |
| FOCUS OPERATION AUTOMATIC SWITCHING MODE | AUTOFOCUS OPERATION WHEN FIRST RELEASE SWITCH TURNS ON AND FOCUSING LENS MOVES IN ACCORDANCE WITH ROTATION OF OPERATION RING | DISTANCE-SPECIFICATION FOCUS OPERATION (FOCUSING LENS MOVES IN ACCORDANCE WITH DISPLAY OF DISTANCE SCALE) |

FIG.13

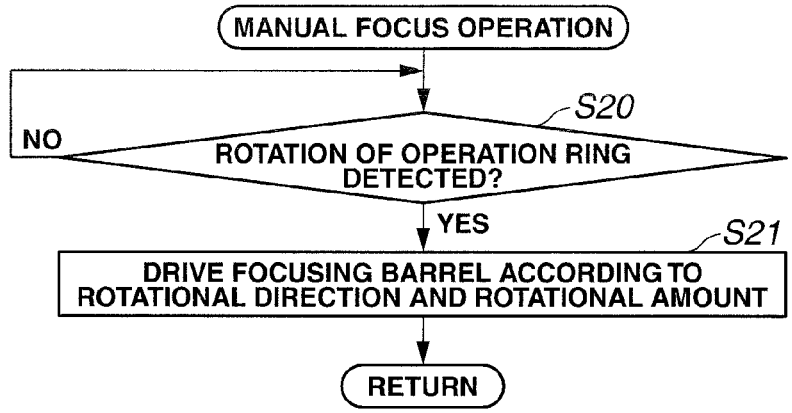

FIG.14

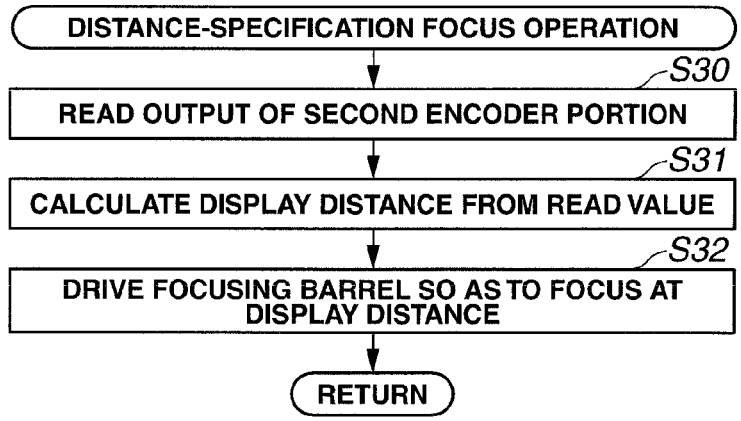

FIG.15

| POSITION IN OPTICAL AXIS DIRECTION OF OPERATION RING / SELECTED FOCUS OPERATION MODE | FIRST POSITION | SECOND POSITION |
|---|---|---|
| MANUAL FOCUS MODE | MANUAL FOCUS OPERATION (FOCUSING LENS MOVES IN ACCORDANCE WITH ROTATION OF OPERATION RING) | DISTANCE-SPECIFICATION FOCUS OPERATION (FOCUSING LENS MOVES IN ACCORDANCE WITH DISPLAY OF DISTANCE SCALE) |
| AUTOFOCUS MODE | AUTOFOCUS OPERATION (FOCUSING LENS DOES NOT MOVE EVEN IF OPERATION RING ROTATES) | DISTANCE-SPECIFICATION FOCUS OPERATION (FOCUSING LENS MOVES IN ACCORDANCE WITH DISPLAY OF DISTANCE SCALE) |
| FOCUS OPERATION AUTOMATIC SWITCHING MODE | AUTOFOCUS OPERATION WHEN FIRST RELEASE SWITCH TURNS ON AND FOCUSING LENS MOVES IN ACCORDANCE WITH ROTATION OF OPERATION RING | DISTANCE-SPECIFICATION FOCUS OPERATION (FOCUSING LENS MOVES IN ACCORDANCE WITH DISPLAY OF DISTANCE SCALE) |

CAMERA SYSTEM

CROSS REFERENCE TO RELATED APPLICATION

This application is a continuation application of PCT/JP2012/060444 filed on Apr. 18, 2012 and claims benefit of Japanese Application No. 2011-140802 filed in Japan on Jun. 24, 2011, the entire contents of which are incorporated herein by this reference.

BACKGROUND OF THE INVENTION

1. Field of the Invention

The present invention relates to a camera system in which an autofocus operation is possible.

2. Description of the Related Art

Camera systems in which a manual focus operation and an autofocus operation are possible mainly adopt a configuration that includes a rotatable operation ring on a lens barrel, and in which a focusing distance is changed in accordance with rotation of the operation ring at a time of the manual focus operation, and the focusing distance is changed by a motor at a time of the autofocus operation.

For example, Japanese Patent Application Laid-Open Publication No. 6-11643 discloses a lens barrel in which an operation ring does not rotate at a time of autofocusing, and in which manual focusing can be performed by switching of a position of the operation ring in the optical axis direction and a focus operation can be performed in accordance with rotation of the operation ring.

SUMMARY OF THE INVENTION

A camera system according to one aspect of the present invention includes: a fixed member; a drive source; a focusing lens; a drive portion that is driven by the drive source, and that drives the focusing lens in an optical axis direction; a rotational member to be engaged that is rotatable around an optical axis; an operation ring that can be positioned at a first position and a second position in the optical axis direction, and that is capable of rotation around the optical axis at each of the first position and the second position for driving the focusing lens in the optical axis direction; operation ring position detection means that detects whether the operation ring is at the first position or at the second position; engagement means that, when the operation ring is at the second position, causes the rotational member to be engaged and the operation ring to engage with each other and rotates the rotational member to be engaged accompanying rotation of the operation ring, and when the operation ring is at the first position, disengages the rotational member to be engaged and the operation ring from each other so that the rotational member to be engaged does not rotate even if the operation ring rotates; and control means that, when it is detected by the operation ring position detection means that the operation ring is at the first position, and when the operation ring is rotated, drives the focusing lens to an arbitrary position by means of the drive portion in accordance with the rotation, and when it is detected by the operation ring position detection means that the operation ring is at the second position, drivingly controls the focusing lens by means of the drive portion in accordance with a relative movement position between the rotational member to be engaged and the fixed member.

BRIEF DESCRIPTION OF THE DRAWINGS

FIG. 13 is a flowchart of a manual focus operation subroutine.

FIG. 14 is a flowchart of a distance-specification focus operation subroutine.

FIG. 15 is a table that summarizes switching of focus operations of the camera system.

DETAILED DESCRIPTION OF THE PREFERRED EMBODIMENTS

Figure 1:
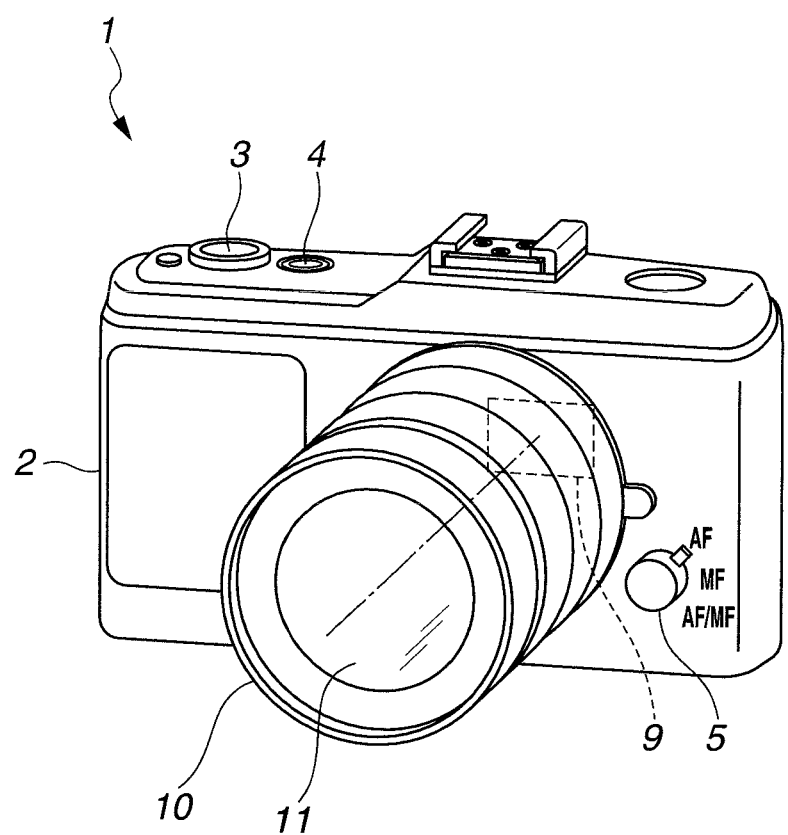
FIG. 1 is a perspective view showing a front face side of a camera constituting a camera system.

Preferred embodiments of the present invention are described hereunder with reference to the drawings. It should be noted that each of the components in the drawings referred to in the following description is displayed in a different contraction scale so as to be shown in a size that is recognizable in the drawings. Further, the present invention is not limited to only the quantity of components, the shapes of components, the ratios between the sizes of components, and the relative positional relationship between the respective components described in the drawings.

First Embodiment

As shown in FIG. 1, a camera system 1 of the present embodiment includes a camera body 2 and a lens barrel 10 as an interchangeable lens. The lens barrel 10 holds an optical system member 11 for forming an object image. As one example according to the present embodiment, the camera system 1 has a form in which the camera body 2 and the lens barrel 10 can be detachably attached to each other. Note that the camera system 1 may also have a form in which the camera body and the lens barrel are integrated.

Further, as one example according to the present embodiment, the camera system 1 has a configuration referred to as a so-called "electronic camera" or "digital camera" or the like, in which an image pickup device 9 is provided in the camera body 2 and which electronically picks up an object image and records the image. The image pickup device 9 outputs, at a predetermined timing, an electrical signal in accordance with light incident on a light-receiving surface (pixel region). For example, the image pickup device 9 has the form of a charge coupled device (CCD), a CMOS (complementary metal-oxide semiconductor) sensor or the like.

The camera system 1 is configured so as to enable an autofocus operation (automatic focus operation). An autofocus sensor portion that is used for an autofocus operation is arranged in the camera body 2. As one example according to the present embodiment, the camera system 1 is configured so as to perform an autofocus operation according to a so-called "contrast detection method" in which a contrast value of an object image is detected based on a signal that is outputted from the image pickup device 9, and focusing control of the optical system member 11 is performed so that the contrast value becomes the maximum value. That is, in the camera system 1 of the present embodiment, the image pickup device 9 is an autofocus sensor portion.

Note that the camera system 1 may also be configured to perform an autofocus operation according to a so-called phase difference detection method. In this case, a sensor that detects a phase difference of an object image that is arranged in the camera body 2 serves as an autofocus sensor portion. Further, the autofocus sensor portion may also be of a different form, such as a distance measuring sensor according to a triangulation method that uses an infrared LED.

A release switch 3 that is switch means that a user uses to input an instruction to perform an image pickup operation, and a power switch 4 that the user uses to input an instruction to perform an operation to turn the power supply of the camera body 2 on and off are arranged on a top face portion of the camera body 2.

According to the present embodiment, the release switch 3 is a push-button type switch that includes two release switches, namely, a first release switch 3a and a second release switch 3b, that enter an "on" state in response to two different stroke amounts (depression amounts).

When a so-called "half-stroke operation" is performed in which the release switch 3 is depressed by an amount that is a partial amount of a full stroke amount, the first release switch 3a enters an "on" state. When a so-called "full-stroke operation" is performed in which the release switch 3 is depressed further than in the half-stroke operation, the second release switch 3b enters an "on" state. When the second release switch 3b enters an "on" state, the camera system 1 executes an image pickup operation and stores the image.

Note that the release switch 3 may be of a form in which the first release switch 3a and the second release switch 3b are arranged at separated positions. Further, the release switch 3 is not limited to the form of a push-button type switch, and may be a switch of another form such as a touch sensor.

A focus mode switching operation portion 5 for inputting an instruction to switch a mode of a focus operation of the camera system 1 is arranged on the camera body 2. By operating the focus mode switching operation portion 5, a user selects one of an autofocus operation mode that performs an autofocus operation, a manual focus operation mode that performs a manual focus operation, and a mode that combines the autofocus operation mode that performs the autofocus operation and the manual focus operation mode that performs the manual focus operation (hereunder, referred to as focus operation automatic switching mode) as the focus operation mode of the camera system 1. Operations of the camera system 1 in the aforementioned modes are described later.

As one example, the focus mode switching operation portion 5 of the present embodiment shown in the drawings is in the form of a dial switch and configured such that, by rotating the dial switch, the user can select any one of the autofocus operation mode, the manual focus operation mode, and the focus operation automatic switching mode.

Note that the form of the focus mode switching operation portion 5 is not limited to that of the present embodiment, and may be a touch sensor, a button switch, a slide switch or the like. Further, the camera body 2 may include an image display apparatus, and the focus mode switching operation portion 5 may be of a form that accepts an instruction to switch the focus operation mode from the user by means of a so-called GUI (graphical user interface) by selecting, through a button switch or a touch sensor, a menu displayed on the image display apparatus. In this case, the focus mode switching operation portion 5 is configured with a configuration that enables display of the GUI and operations thereon and a configuration that stores an instruction from the user that is inputted through the GUI. Note that a form may also be adopted in which the focus mode switching operation portion 5 is arranged on the lens barrel 10.

Although not shown in the drawings, a battery housing portion that houses a primary battery or a secondary battery for supplying power to the camera system 1, and a storage media housing portion that houses a flash memory for storing images are provided in the camera body 2.

According to the present embodiment, the camera body 2 and the lens barrel 10 can be detachably attached to each other by means of an engagement mechanism that is generally referred to as a "bayonet mount". Note that, in the camera system 1, a configuration that makes the camera body 2 and the lens barrel 10 detachably attachable to each other is not limited to the present embodiment and, for example, a configuration that is generally referred to as a "screw-type mount" that uses a screw mechanism may be adopted. Further, a configuration may be adopted that makes the camera body 2 and the lens barrel 10 detachably attachable to each other by means of a mechanism that fits the camera body 2 and the lens barrel 10 together or uses a magnet or the like.

The lens barrel 10 is configured to include a base portion 12, a fixed barrel (first barrel) 14, a focusing barrel 13, a drive portion 15, an indicator display barrel 16, a rotational member to be engaged (second barrel, display member, distance display means) 18, and an operation ring (rotational operation member, operation means) 17. Note that the rotational member to be engaged 18 is mainly constituted of a first cylindrical member that has a cylindrical shape, and also includes a thin second cylindrical member that is shorter than the first cylindrical member in the axial direction and that is fitted to an outer circumference thereof and fixed thereto. A distance scale 18a that is described later is displayed on the outer circumference of the second cylindrical member. Hereunder, the rotational member to be engaged 18 is described as a member in which the first cylindrical member and the second cylindrical member are integrated.

Figure 2:
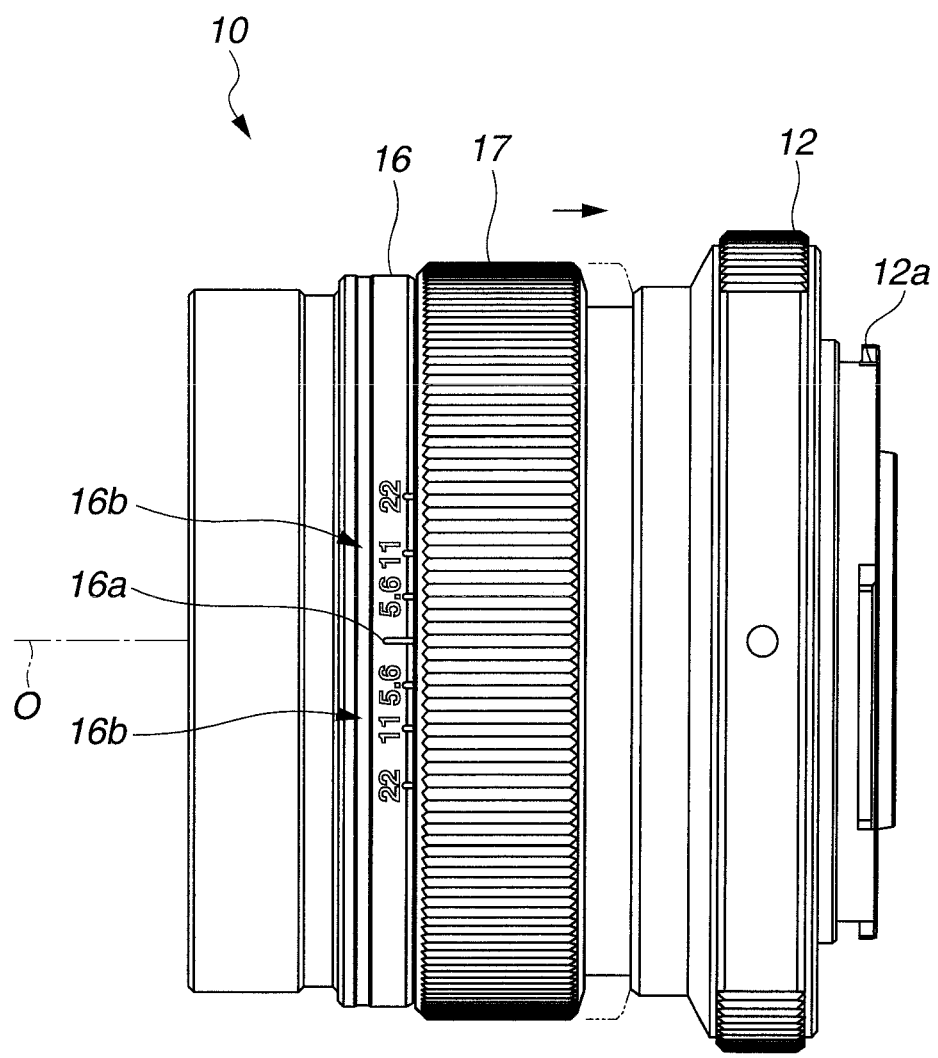
FIG. 2 is a top face view of a lens barrel in a state where an operation ring is positioned at a first position.

As shown in FIG. 2, the base portion 12 has a bayonet portion 12a that engages with the camera body 2. The base portion 12 is fixed to the camera body 2 by the bayonet portion (bayonet claw) 12a engaging with the camera body 2.

Figure 4:
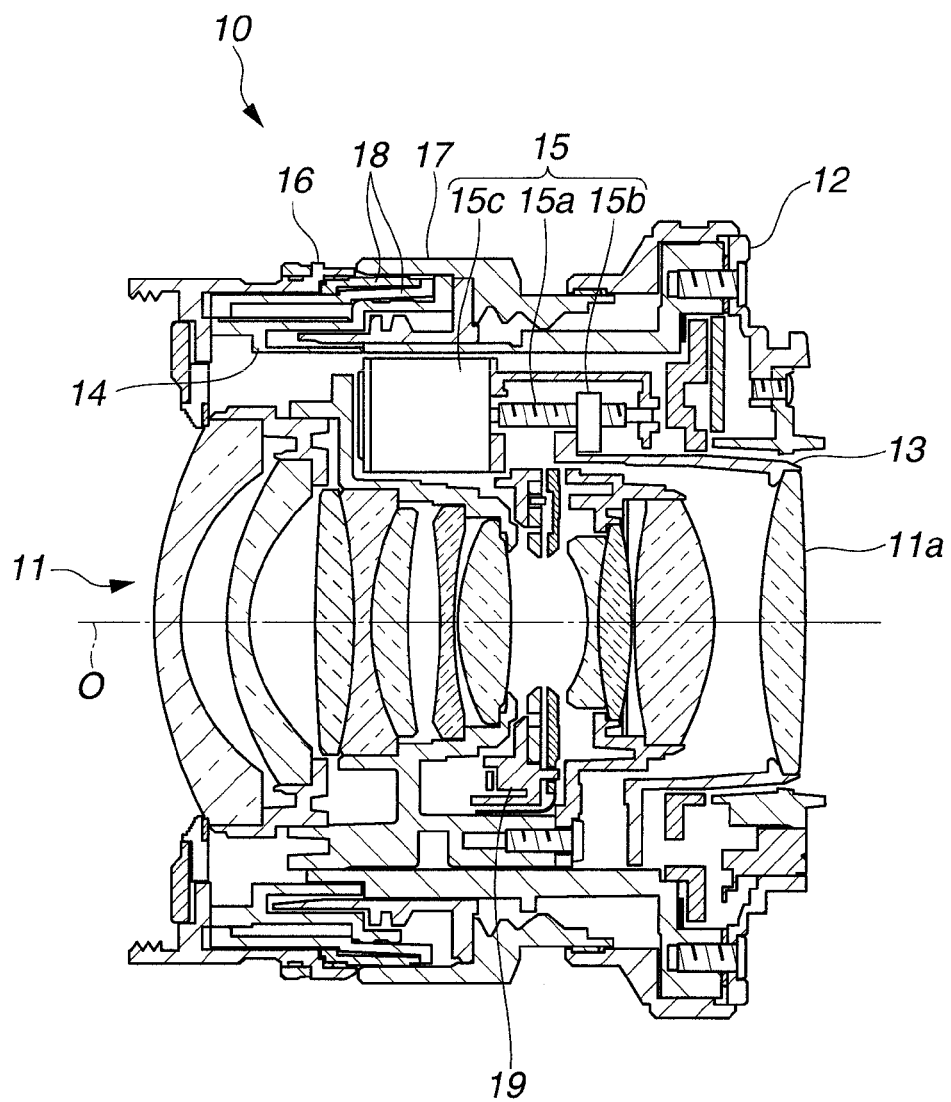
FIG. 4 is a cross-sectional view of the lens barrel.

As shown in FIG. 4, the lens barrel 10 has a mechanism that holds an optical system member 11 that includes a plurality of lens and the like as an image pickup optical system with respect to the base portion 12. Note that the form of the optical system member 11 that the lens barrel 10 holds may be a form that includes a diaphragm, a prism, a mirror, a filter or the like in addition to lenses.

A configuration is adopted so that the focusing distance changes in accordance with relative movement of part or all of the optical system member (optical system elements and image pickup optical system) 11 in an optical axis O direction of the optical system member 11 with respect to the base portion 12. Here, the term "focusing distance change" refers to changing a distance to an object that an attempt is being made to focus on. The term also refers to changing a focus position on which the optical system member 11 is focused. Hereunder, among the elements of the optical system member 11, an element that moves in the optical axis O direction when changing the focusing distance is referred to as a focusing lens (focusing optical element, focusing optical system member) 11a.

Specifically, the optical system member 11 of the present embodiment includes a plurality of lenses and a diaphragm mechanism portion 19 that are arranged along the optical axis O. According to the present embodiment, a lens that is arranged at the most rearward position (image side) among the plurality of lens of the optical system member 11 is the focusing lens 11a.

The focusing lens 11a is held by the focusing barrel 13 that is arranged so as to be moveable forward and rearward in the optical axis O direction relative to the base portion 12. The focusing barrel 13 is driven in the optical axis O direction by the drive portion 15.

Although the configuration of the drive portion 15 is not particularly limited, according to the present embodiment, the drive portion 15 includes a screw 15a arranged substantially parallel to the optical axis O, a drive source (motor) 15c that rotates the screw 15a, and a nut 15b that is screwed together with the screw 15a. As one example according to the present embodiment, the drive source 15c is a stepping motor. The rotation around the screw 15a of the nut 15b is restricted, and the nut 15b moves substantially parallel to the optical axis O accompanying rotation of the screw 15a. The focusing barrel 13 is engaged with the nut 15b so as to follow the nut 15b.

The drive portion 15 drives the focusing barrel 13 in the optical axis O direction by rotating the screw 15a by means of the drive source 15c Note that the configuration of the drive portion 15 is not limited to the present embodiment, and may be another form such as a linear motor. In addition, the drive portion 15, for example, may have a configuration in which some constituent members, such as the drive source, are arranged inside the camera body 2.

Elements other than the focusing lens 11a of the optical system member 11 are held by a fixed barrel 14 as a first barrel whose position with respect to the base portion 12 is fixed.

Note that, although elements other than the focusing lens 11a of the optical system member 11 are held by the fixed barrel 14 because the lens barrel 10 of the present embodiment has the form of a so-called "fixed focal length lens" in which the focal distance is fixed, it goes without saying that in a case where the lens barrel 10 is a so-called "collapsible lens barrel" in which the entire length can be expanded and contracted or a case where the lens barrel 10 is a so-called "zoom lens" or "varifocal lens" in which a focal distance can be changed, members other than the focusing lens 11a of the optical system member 11 are also held by a barrel member that moves relatively with respect to the base portion 12.

The operation ring 17, the indicator display barrel 16 and the rotational member to be engaged 18 that is the display member are arranged on the outer circumferential portion of the lens barrel 10.

The operation ring 17 is a substantially cylindrical member that is arranged so as to be rotatable around the optical axis O of the optical system member 11 on the outer circumferential portion of the lens barrel 10, and also to be movable forward and rearward in the optical axis O direction. At least one part of the operation ring 17 is exposed on the outer circumferential face of the lens barrel 10, and is arranged so that a finger of a user of the camera system 1 engages therewith.

Figure 5:
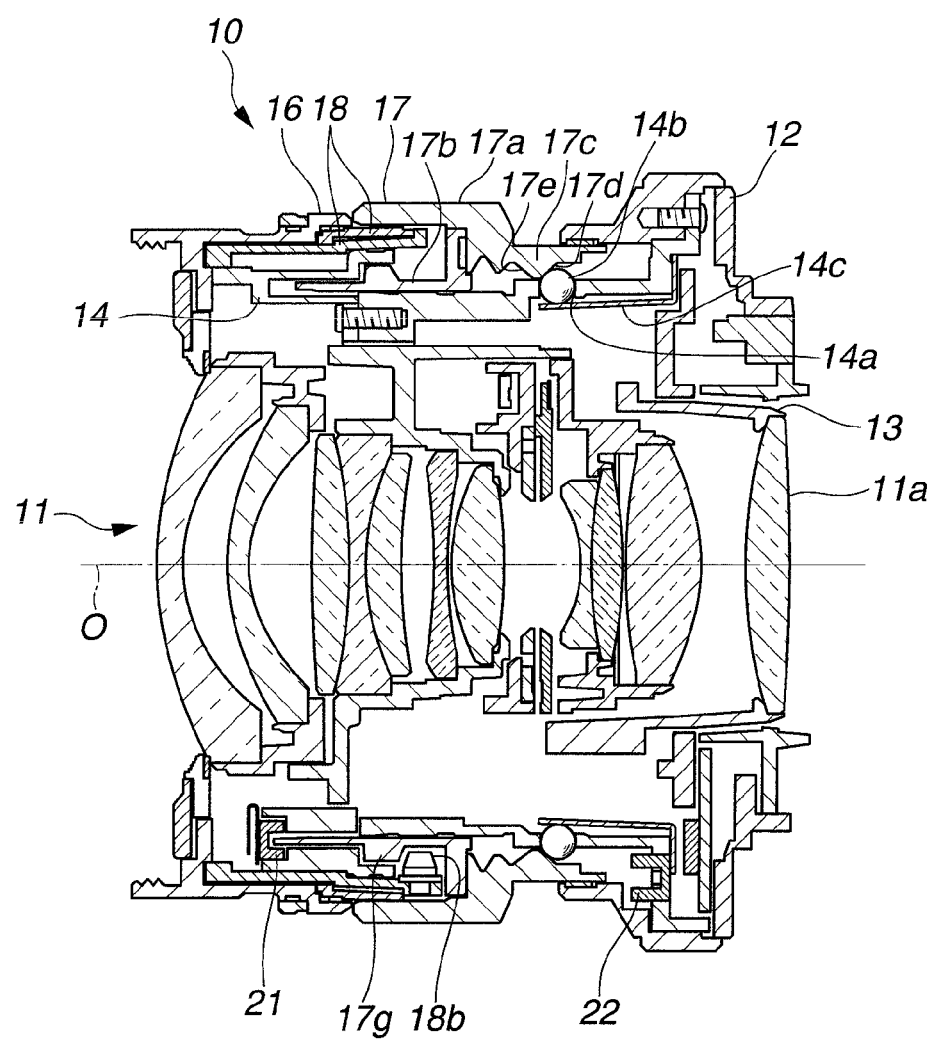
FIG. 5 is a cross-sectional view of the lens barrel in a state where the operation ring is positioned at the first position.
Figure 6:
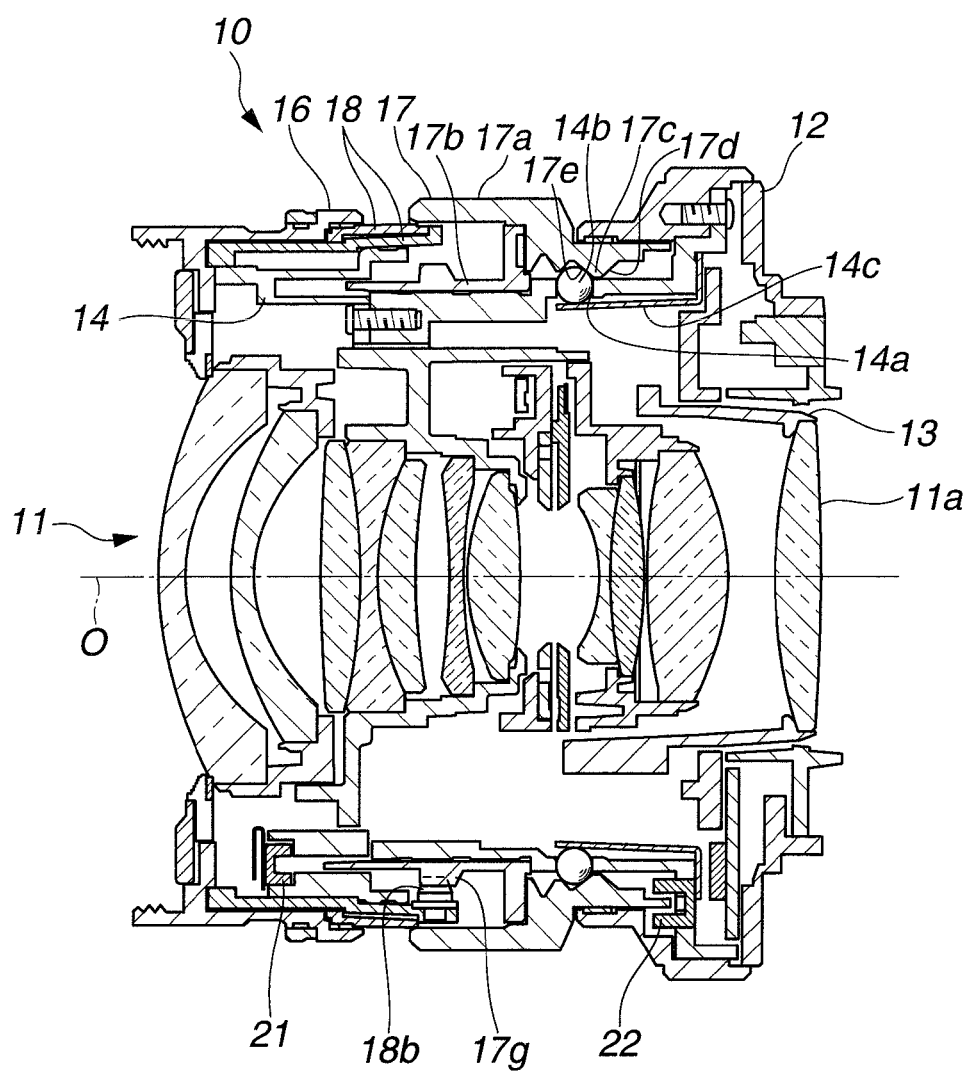
FIG. 6 is a cross-sectional view of the lens barrel in a state where the operation ring is positioned at the second position.
Figure 7:
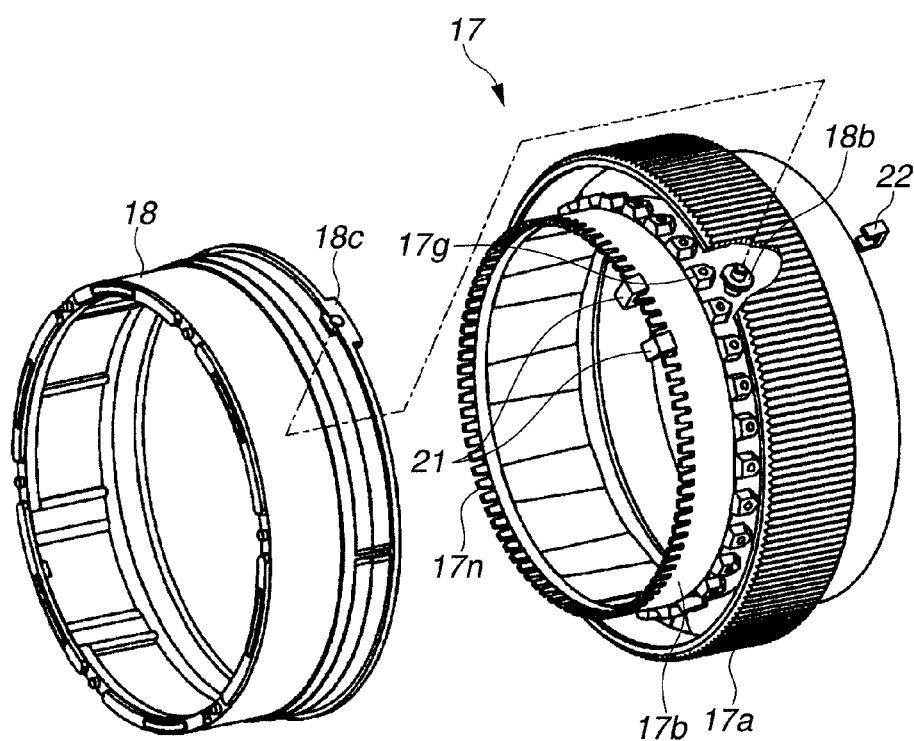
FIG. 7 is an exploded perspective view illustrating a state where engagement between the operation ring and a rotational member to be engaged has been released.
Figure 8:
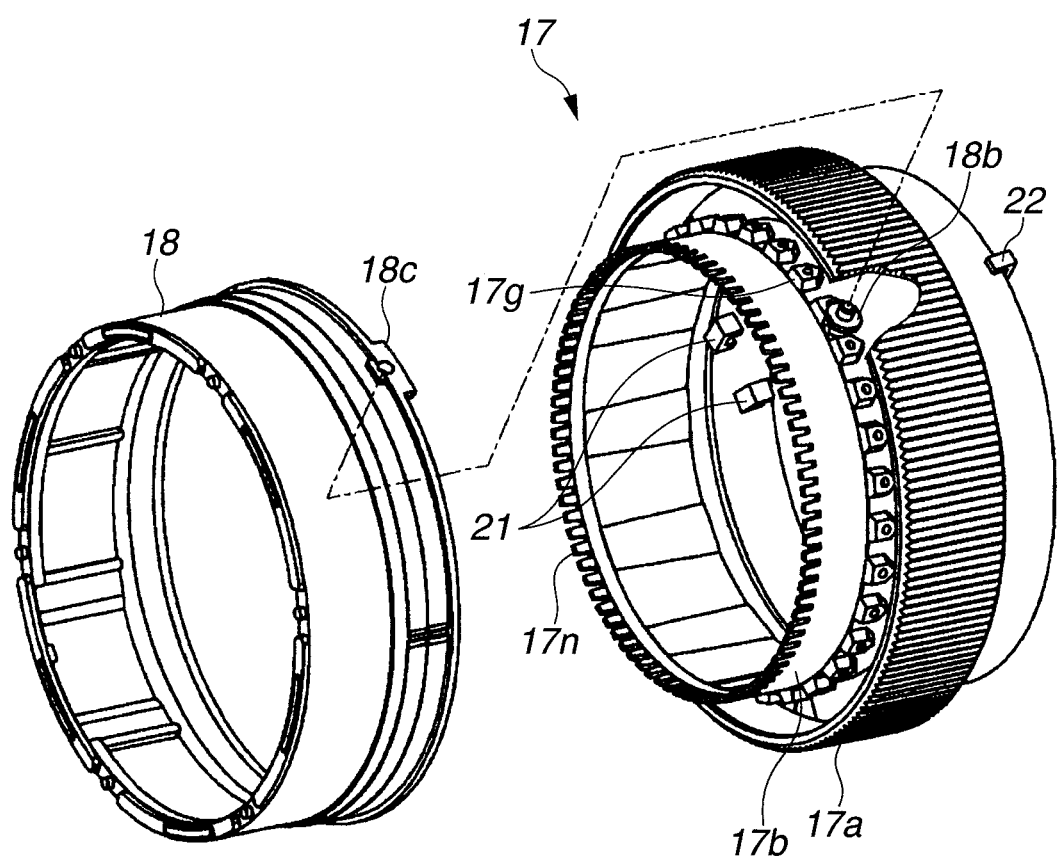
FIG. 8 is an exploded perspective view illustrating a state where the operation ring and the rotational member to be engaged are engaged.

Specifically, according to the present embodiment, as shown in the cross-sectional views of FIG. 5 and FIG. 6 and in the perspective views of FIG. 7 and FIG. 8, the operation ring 17 includes two substantially cylindrical areas, namely, a substantially cylindrical operation portion 17a that is exposed on the outer circumferential face of the lens barrel 10 and in which projections and depressions are provided on an outer circumferential portion so that fingers of a user engage therewith and an inside cylindrical portion (engagement barrel) 17b that is substantially cylindrical and is arranged on the inner side of the operation portion 17a with a predetermined clearance therebetween.

Note that, according to the present embodiment illustrated in the drawings, although the operation ring 17 is constituted by the operation portion 17a and the inside cylindrical portion 17b that are separate members which are, for example, fixed by screws or an adhesive, a form may also be adopted in which the operation portion 17a and the inside cylindrical portion 17b are formed integrally with each other.

Figure 3:
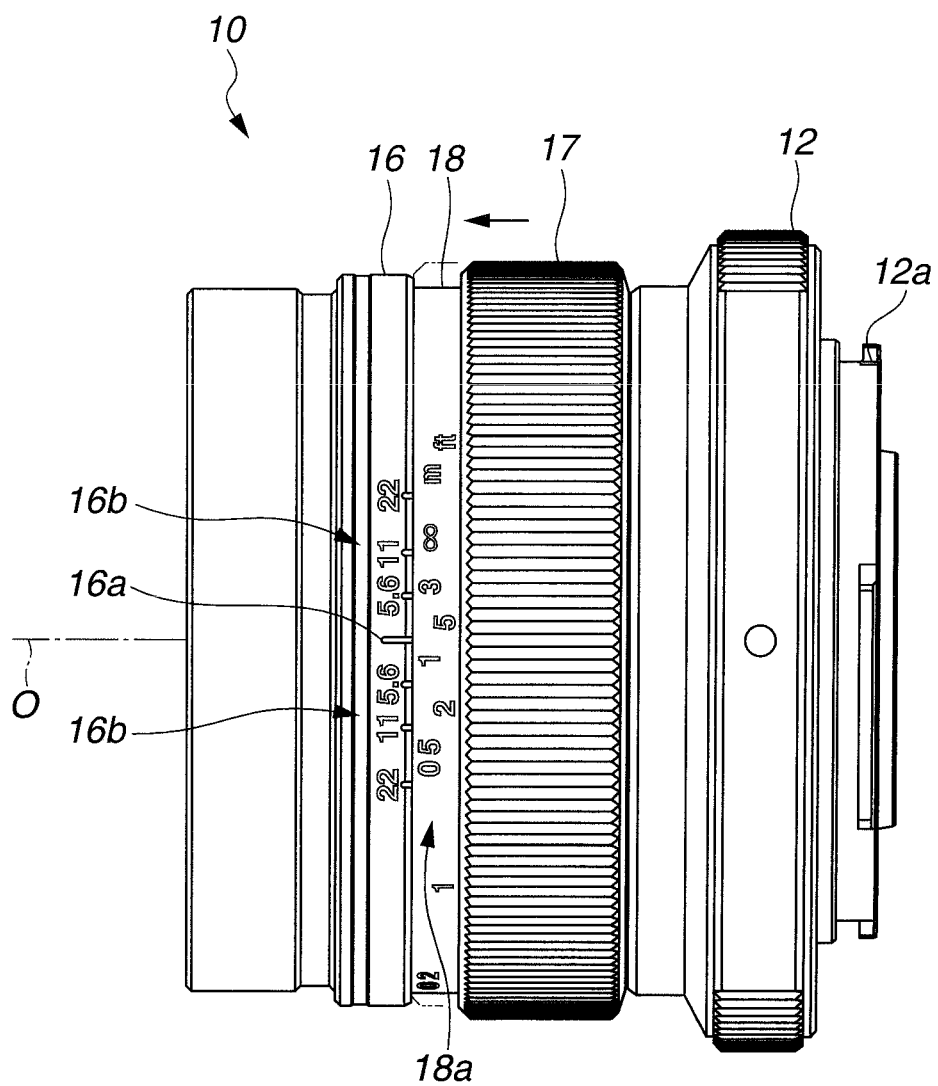
FIG. 3 is a top face view of the lens barrel in a state where the operation ring is positioned at a second position.

The operation ring 17 rotates around the optical axis O by means of a force applied to the operation portion 17a by fingers of the user. As shown in FIG. 2 and FIG. 3, the operation ring 17 is moveable within a predetermined range in the optical axis O direction, and is arranged so as to be selectively positioned at either one of two ends of the moving range in a state in which a force is not being applied thereto from outside. The operation ring 17 can be moved back and forth from one end to the other end of the moving range and from the other end to the one end thereof in the optical axis O direction by a force applied to the operation portion 17a by fingers of the user.

Hereunder, among the two positions at which the operation ring 17 is selectively positioned, an end portion on the front side (object side) of the moving range in the optical axis O direction is referred to as a "first position" and an end portion on the rear side (image side) of the moving range is referred to as a "second position".

That is, FIG. 2, FIG. 4, FIG. 5 and FIG. 7 illustrate a state in which the operation ring 17 is positioned at the first position, while FIG. 3, FIG. 6 and FIG. 8 illustrate a state in which the operation ring 17 is positioned at the second position.

As shown in FIG. 5 and FIG. 6, on an inner circumferential face of the operation ring 17, a convex portion 17c that protrudes to the inner side in the diameter direction and has a cross-section that is a substantially triangular shape is formed across the entire circumference in the circumferential direction. The convex portion 17c includes a first inclined face portion 17d and a second inclined face portion 17e. The first inclined face portion 17d is formed so that the inner diameter thereof decreases in accordance with proximity to the front along the optical axis O and reaches the apex of the triangular shape. The second inclined face portion 17e is formed so the inner diameter thereof increases in accordance with proximity to the front along the optical axis O from the apex of the triangular shape on the front side of the first inclined face portion 17d.

A through-hole 14a is formed at a location facing the convex portion 17c in the fixed barrel 14 that is arranged on the inner side of the operation ring 17. A ball 14b is loosely fitted inside the through-hole 14a. The ball 14b can protrude further to the outside than the outer circumferential face of the fixed barrel 14, and is urged towards the outer side in the diameter direction of the fixed barrel 14 by an urging member 14c that is a plate spring. A spring portion (plate spring) of the urging member 14c is disposed on the inner circumferential face of the fixed barrel 14. The urging member 14c and the ball 14b are arranged at a plurality of places in the circumferential direction.

When the operation ring 17 is positioned at the first position, the ball 14b contacts against the first inclined face portion 17d of the convex portion 17c, and when the operation ring 17 is positioned at the second position, the ball 14b contacts against the second inclined face portion 17e of the convex portion 17c. Because the convex portion 17c has a substantially triangular cross-section, irrespective of the position of the operation ring 17, the ball 14b is always contacting against either one of the first inclined face portion 17d and the second inclined face portion 17e.

Accordingly, when the operation ring 17 is situated towards the front of the moveable range, the operation ring 17 is urged frontward by the ball 14b that contacts against the first inclined face portion 17d, and contacts against one end of the moveable range at the first position and is thereby positioned at the first position.

On the other hand, when the operation ring 17 is situated towards the rear of the moveable range, the operation ring 17 is urged rearward by the ball 14b that contacts against the second inclined face portion 17e, and contacts against the other end of the moveable range at the second position and is thereby positioned at the second position.

Therefore, in the lens barrel 10 of the present embodiment, when an external force is not being applied to the operation ring 17, the position in the optical axis O direction of the operation ring 17 is either one of the first position and the second position. For example, in a state where the operation ring 17 is positioned at the first position, if an external force in the rearward direction that is applied to the operation ring 17 is weaker than an urging force that the urging member 14c and the ball 14b generate, when the external force disappears, the operation ring 17 returns to the first position. Further, for example, in a state where the operation ring 17 is positioned at the first position, if an external force in the rearward direction that is applied to the operation ring 17 is stronger than an urging force that the urging member 14c and the ball 14b generate, the operation ring 17 moves to the second position.

A first encoder portion (operation portion rotation detection portion, rotation detection means) 21 is also arranged in the lens barrel 10. The first encoder portion 21 is first encoder means that, at least when the operation ring 17 is positioned at the first position, detects a rotational direction and a rotational amount around the optical axis O of the operation ring 17. Further, an operation ring position detection means (position detection portion) 22 that detects which one of the first position and the second position in the optical axis O direction the operation ring 17 is positioned at is arranged in the lens barrel 10.

The first encoder portion 21 detects, with a pair of photo-interrupters, passage of a plurality of slits (notches) 17n that are provided in the operation ring 17 at predetermined intervals in the circumferential direction. The first encoder portion 21 detects the rotational direction and the rotational amount of the operation ring 17 based on an output signal of the pair of photo-interrupters. The first encoder portion 21 and the slits 17n provided in the operation ring 17 of the present embodiment have the same form as a so-called incremental-type rotary encoder. A detailed description of an incremental-type rotary encoder is omitted herein.

More specifically, according to the present embodiment, as shown in FIG. 7, the slits 17n are formed in an end portion on a frontward side of the inside cylindrical portion 17b. As shown in FIG. 5 and FIG. 6, the pair of photo-interrupters constituting the first encoder portion 21 are fixed to the fixed barrel 14.

The end portion on the frontward side of the inside cylindrical portion 17b in which the slits 17n are formed is positioned within the detection range of the pair of photo-interrupters only when the operation ring 17 is positioned at the first position. Accordingly, the first encoder portion 21 of the present embodiment can detect the rotational direction and the rotational amount around the optical axis O of the operation ring 17 only in a case where the operation ring 17 is positioned at the first position.

Note that the form of the first encoder portion 21 is not limited to the present embodiment, and the first encoder portion 21 may be of any form that can detect the rotational direction and the rotational amount around the optical axis O of the operation ring 17 in at least a case where the operation ring 17 is positioned at the first position. For example, the first encoder portion 21 may have the form of a magnetic rotary encoder.

The operation ring position detection means 22 is constituted by a photo-interrupter that is fixed to the base portion 12 or the fixed barrel 14. The operation ring position detection means 22 is fixed to a position such that, when the operation ring 17 is positioned at the second position, part of the operation ring 17 advances to inside a detection range of the photo-interrupter.

Note that, the form of the operation ring position detection means 22 is not particularly limited as long as the operation ring position detection means 22 has a configuration that can detect a position in the optical axis O direction of the operation ring 17. For example, the operation ring position detection means 22 may be a magnetic sensor or the like.

Further, engagement convex portions 17g constituting engagement means (engagement portion) are provided on the operation ring 17. The engagement convex portions 17g are portions for engaging with the rotational member to be engaged 18, described later, when the operation ring 17 is positioned at the second position, and causing the operation ring 17 and the rotational member to be engaged 18 to rotate integrally with each other.

The engagement convex portions 17g include a plurality of convex portions that protrude to the outer side in the diameter direction on the outer circumferential face of the inside cylindrical portion 17b. As shown in FIG. 7 and FIG. 8, the plurality of convex portions constituting the engagement convex portions 17g are spaced uniformly in the circumferential direction with a fixed gap therebetween. When viewed from the outer side in the diameter direction, the plurality of convex portions have a substantially V shape in which the width of a part on the rear side narrows towards the rear side.

The form of engagement between the engagement convex portions 17g and the rotational member to be engaged 18 is described later.

The position of the indicator display barrel 16 is fixed with respect to the base portion 12. The indicator display barrel 16 is a barrel member (first barrel) that has a function of a fixed barrel and is part of an exterior member of the lens barrel 10. The indicator display barrel 16 is fixed to the base portion 12 through the fixed barrel 14. The indicator display barrel 16 is arranged at a position that is further to the front side than the operation portion 17a of the operation ring 17 in a state in which the operation ring 17 is positioned at the first position. An indicator 16a that has the shape of a short straight line that is substantially parallel to the optical axis O is provided on the indicator display barrel 16. The indicator 16a is a member for pointing at the distance scale 18a that is provided on the rotational member to be engaged 18 as described later.

A depth-of-field scale 16b is arranged on the indicator display barrel 16 in a substantially symmetrical manner on both sides of the indicator 16a so as to interpose the indicator 16a therebetween. The depth-of-field scale 16b is a scale for displaying a depth of field that corresponds to an F number (diaphragm value) of the optical system member 11. The depth-of-field scale 16b is displayed so that characters representing an F number of the same numeric value form a pair in a manner that interposes the indicator 16a therebetween. The depth-of-field scale 16b includes a plurality of such pairs, and each pair denotes an F number of a different value to the other pairs. Note that, although in the description of the present embodiment a plurality of numeric values (5.6, 11, 22) are displayed, it is sufficient that at least only one pair of numeric values that include the same numeric value is displayed.

The rotational member to be engaged 18 that is a second barrel is a substantially cylindrical member that is arranged on the inside of the operation ring 17 and is capable of relative rotation around the optical axis O with respect to the base portion 12. In other words, the rotational member to be engaged 18 is capable of relative rotation around the optical axis O with respect to the indicator display barrel 16.

As shown in FIG. 3, the distance scale 18a that shows focusing distances of the optical system member 11 is provided on the outer circumferential face of the rotational member to be engaged 18. In the distance scale 18a, numeric values that show distances from the minimum focusing distance of the optical system member 11 to infinity are arrayed in the circumferential direction. The numeric value of the distance scale 18a that is pointed at by the indicator 16a changes as a result of the rotational member to be engaged 18 being rotated relatively around the optical axis O with respect to the indicator display barrel 16.

The rotational range of the rotational member to be engaged 18 around the optical axis O is limited, and the rotational member to be engaged 18 can only rotate around the optical axis O within a range in which the distance scale 18a is pointed at by the indicator 16a. That is, by means of a combination between the distance scale 18a and the indicator 16a, the distance scale 18a always displays a numeric value of a distance between the minimum focusing distance of the optical system member 11 and infinity.

A configuration that limits the rotational range around the optical axis O of the rotational member to be engaged 18 is not particularly limited. As one example according to the present embodiment, a convex portion 18c that protrudes rearward is formed at an end portion at the rear of the rotational member to be engaged 18, and is positioned between a pair of wall portions that are arranged so as to be separated from each other in the circumferential direction on the fixed barrel 14, thereby the rotational range around the optical axis O of the rotational member to be engaged 18 is limited to a range between the positions at which the convex portion 18c collides with the pair of wall portions.

That is, rotation restriction means is provided in which a convex portion is provided in one of the fixed barrel 14 or first barrel to which the indicator display barrel 16 is fixed and the rotational member to be engaged 18 (second barrel) that is rotatable with respect to the first barrel, and which restricts a range of the relative rotation of the second barrel with respect to the first barrel by interference between the convex portion and the other of the first barrel and the second barrel.

According to the present embodiment, as shown in FIG. 2, when the operation ring 17 is positioned at the first position, a state is entered in which the distance scale 18a of the rotational member to be engaged 18 can not be seen from outside of the lens barrel 10. In contrast, as shown in FIG. 3, when the operation ring 17 is positioned at the second position, a state is entered in which the distance scale 18a of the rotational member to be engaged 18 can be seen from outside of the lens barrel 10.

Specifically, the rotational member to be engaged 18 is arranged between the operation portion 17a and the inside cylindrical portion 17b of the operation ring 17. In other words, a cylindrical portion that is the operation portion 17a of the operation ring 17 is arranged at a location that is further on the outer side in the diameter direction than the outer circumferential face of the rotational member to be engaged 18. When the operation ring 17 is positioned at the first position, the operation portion 17a advances over the distance scale 18a and covers and conceals the distance scale 18a. Further, when the operation ring 17 is positioned at the second position, the operation portion 17a withdraws from the position over the distance scale 18a and thus the distance scale 18a is exposed to the outside and displayed. In other words, when the operation ring 17 is positioned at the second position, a state is entered in which the rotational member to be engaged 18 is exposed to outside.

According to the lens barrel 10 of the present embodiment, the rotational member to be engaged 18 is configured so as to rotate around the optical axis O together with the operation ring 17 only in a case where the operation ring 17 is positioned at the second position. Further, when the operation ring 17 is positioned at the first position, the operation ring 17 can rotate independently of the rotational member to be engaged 18.

Specifically, one engagement pin 18b constituting engagement means is provided so as to protrude to the inner side in the diameter direction on the inner circumferential portion (inner circumferential face) of the rotational member to be engaged 18. According to the present embodiment, the engagement pin 18b is a separate member from the rotational member to be engaged 18 and is fixed to the rotational member to be engaged 18 by press-fitting or an adhesive. Note that the engagement pin 18b may also be integrally formed with the rotational member to be engaged 18.

Since the rotational member to be engaged 18 is arranged between the operation portion 17a and the inside cylindrical portion 17b of the operation ring 17, the engagement pin 18b protrudes in the direction of the inside cylindrical portion 17b that is arranged on the inner side of the rotational member to be engaged 18. In other words, the engagement pin 18b of the rotational member to be engaged 18 and the engagement convex portions 17g of the operation ring 17 protrude in a direction in which they face each other.

The external diameter of the engagement pin 18b is smaller than a clearance between adjacent engagement convex portions 17g, and the engagement pin 18b has a shape that fits in a loose fitting state between adjacent engagement convex portions 17g. In addition, the engagement pin 18b has a cross-sectional shape in which the frontward side when viewed from the inner side in the diameter direction is a substantially V shape.

As shown in FIG. 5 and FIG. 7, when the operation ring 17 is positioned at the first position, the engagement pin 18b is arranged at a position that is further on the rear side than the engagement convex portions 17g of the operation ring 17 and that is a position such that the engagement pin 18b does not interfere with the engagement convex portions 17g even if the operation ring 17 rotates around the optical axis O.

As shown in FIG. 6 and FIG. 8, when the operation ring 17 is positioned at the second position, the engagement pin 18b is positioned in the same circumferential direction as the engagement convex portions 17g. In other words, when the operation ring 17 is positioned at the second position, the engagement pin 18b is arranged at a position that overlaps with the engagement convex portions 17g in the optical axis O direction. That is, when the operation ring 17 moves relatively from the first position to the second position, the engagement pin 18b fits between adjacent engagement convex portions 17g. Conversely, when the operation ring 17 moves relatively from the second position to the first position, the fitting state between the engagement pin 18b and the engagement convex portions 17g is released.

By means of the engagement means including the engagement convex portions 17g and the engagement pin 18b having the above described configuration, when the operation ring 17 is positioned at the second position, the rotational member to be engaged 18 rotates around the optical axis O together with the operation ring 17, and when the operation ring 17 is positioned at the first position, even if the operation ring 17 rotates around the optical axis O, the rotational member to be engaged 18 does not rotate and remains stopped.

Note that, as described above, the rearward side of each of the plurality of convex portions of the engagement convex portions 17g has a substantially V shape as viewed from the outer side in the diameter direction, and the frontward side of the engagement pin 18b has a substantially V shape as viewed from the inner side in the diameter direction. Hence, when the operation ring 17 moves from the first position to the second position, the rotational member to be engaged 18 slightly rotates due to the substantially V-shaped areas provided in the operation ring 17 and the rotational member to be engaged 18 following each other, and consequently the engagement pin 18b and the engagement convex portions 17g smoothly engage. Therefore, a catching action does not occur when an operation is performed to move the operation ring 17 in the optical axis O direction, and movement of the operation ring 17 can be rapidly performed.

Further, as described above, the rotational range of the rotational member to be engaged 18 is limited to a range in which a combination of the distance scale 18a and the indicator 16a displays a numeric value of a distance between the minimum focusing distance of the optical system member 11 and infinity. Consequently, when the operation ring 17 is positioned at the second position and engaged with the rotational member to be engaged 18, it is possible for the operation ring 17 to rotate only within the same rotational range as the rotational member to be engaged 18. That is, when the operation ring 17 is positioned at the second position, a limitation is applied to the rotational range of the operation ring 17.

As described above, when the operation ring 17 is positioned at the second position, the range of rotation of the operation ring 17 is also restricted to a predetermined range by the rotation restriction means that restricts the range of the relative rotation of the rotational member to be engaged 18 (second barrel) with respect to the fixed first barrel.

On the other hand, when the operation ring 17 is positioned at the first position, since the operation ring 17 does not interfere with the rotational member to be engaged 18, there is no limitation on the rotational range of the operation ring 17. That is, when the operation ring 17 is positioned at the first position, the operation ring 17 can rotate without any limitation, without the range of rotation being restricted by the rotation restriction means.

A second encoder portion 23 (rotation position detection means) that is second encoder means that detects an absolute rotational position around the optical axis O of the rotational member to be engaged 18 with respect to the base portion 12 is also arranged in the lens barrel 10 of the present embodiment.

Figure 9:
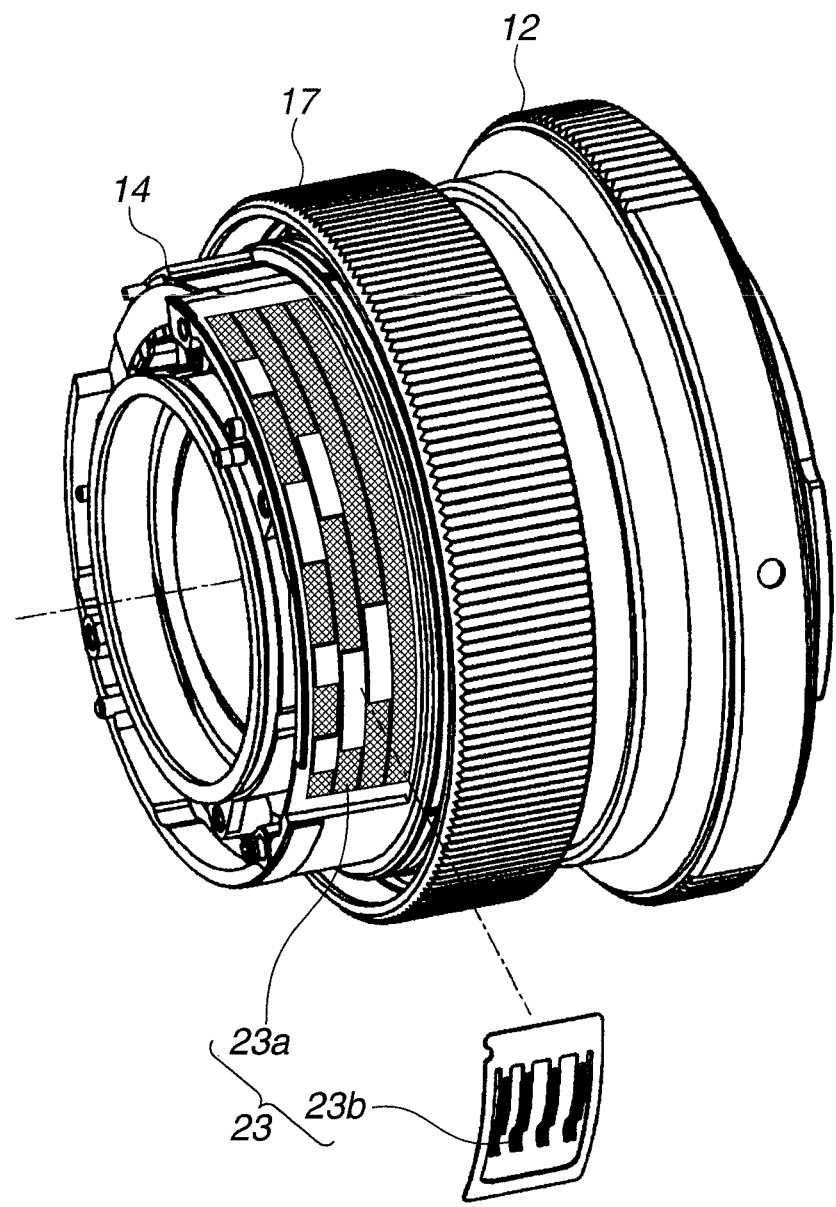
FIG. 9 is a perspective view illustrating a configuration of a second encoder portion.

As shown in FIG. 9, as one example according to the present embodiment, the second encoder portion 23 is configured to have the form of a so-called "absolute rotary encoder". The second encoder portion 23 includes a code pattern 23a of a predetermined number of bits constituted by a conductor, and a contact portion 23b constituted by a conductor that slides over the code pattern 23a.

The code pattern 23a is arranged on the outer circumferential portion of the fixed barrel 14. The contact portion 23b is arranged on the rotational member to be engaged 18. The position of the code pattern 23a that the contact portion 23b contacts changes according to the rotational position around the optical axis O of the rotational member to be engaged 18. Although not shown in the drawings, the second encoder portion 23 has an electric circuit that detects a state of contact between the code pattern 23a and the contact portion 23b, and the absolute rotational position around the optical axis O of the rotational member to be engaged 18 with respect to the base portion 12 can be calculated based on the detection result. Since a configuration of the absolute rotary encoder is known, a detailed description thereof is omitted herein.

Note that the configuration of the second encoder portion 23 is not limited to the present embodiment as long as a form is adopted that enables detection of an absolute rotational position around the optical axis O with respect to the base portion 12. For example, the second encoder portion 23 may be an optical or magnetic absolute rotary encoder, and a form may also be adopted that has a configuration similar to a so-called "potentiometer", in which a resistance value changes in accordance with the rotational position around the optical axis O of the rotational member to be engaged 18.

Figure 10:
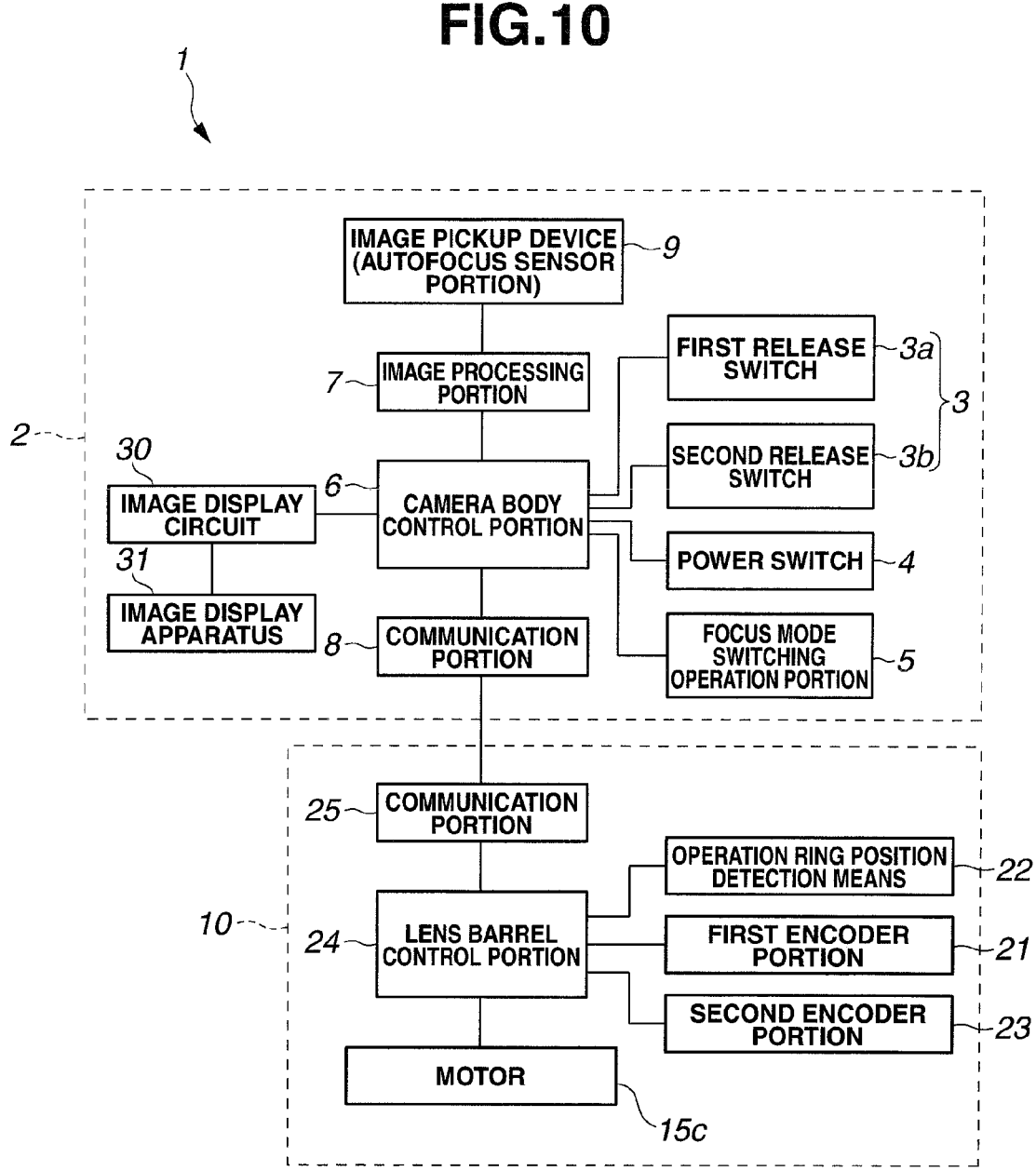
FIG. 10 is a block diagram of an electric circuit involved in focus operations of the camera constituting the camera system.

Next, the electrical configuration of portions involved in focusing operations of the camera system 1 is described referring to FIG. 10.

As described in the foregoing, the release switch 3, the power switch 4, the focus mode switching operation portion 5 and the image pickup device 9 that is an autofocus sensor portion are arranged in the camera body 2. In addition, a camera body control portion 6, an image processing portion 7, a communication portion 8, an image display circuit 30, and an image display apparatus 31 are arranged in the camera body 2.

The camera body control portion (control means) 6 that constitutes a control portion includes a processing apparatus (CPU), a storage apparatus (RAM), an input/output apparatus, a power control apparatus and the like, and controls operations of the camera body 2 based on a predetermined program.

The image processing portion 7 is an electronic circuit portion for performing image processing. The image processing portion 7 can calculate a contrast value of an object image based on a signal that is outputted from the image pickup device 9. Note that a form of implementing the image processing portion 7 in the camera body 2 may be a hardware form in which computational hardware for image processing is mounted in the camera body 2, or may be a software form in which the processing apparatus of the camera body control portion 6 performs image processing based on a predetermined image processing program.

The communication portion 8 is a portion for performing communication with a lens barrel control portion 24 through a communication portion 25 provided in the lens barrel 10 by wire communication or wireless communication. The image processing circuit 30 is a circuit for displaying an object image from the image pickup device 9 on the image display apparatus 31, and for example, displays an object image during a focusing operation on the image display apparatus 31.

As described above, the drive portion 15, the operation ring position detection means 22, the first encoder portion 21 and the second encoder portion 23 are arranged in the lens barrel 10. The lens barrel control portion 24 and the communication portion 25 are also arranged in the lens barrel 10. The communication portion 25, the operation ring position detection portion 22, the first encoder portion 21, the second encoder portion 23 and the motor 15c of the drive portion 15 are electrically connected to the lens barrel control portion 24.

The lens barrel control portion (control means) 24 constituting a control portion includes a processing apparatus, a storage apparatus, an input/output apparatus and the like, and controls operations of the lens barrel 10 based on a predetermined program in conjunction with the camera body control portion 6. Further, the communication portion 25 is a portion for performing communication with the camera body control portion 6 through the communication portion 8 provided in the camera body 2 by wire communication or wireless communication. Because the communication portion 8 and the communication portion 25 are provided, the lens barrel 10 can be detachably attached to the camera body 2.

Next, operations of the camera system 1 that has the above described configuration are described.

Figure 11:
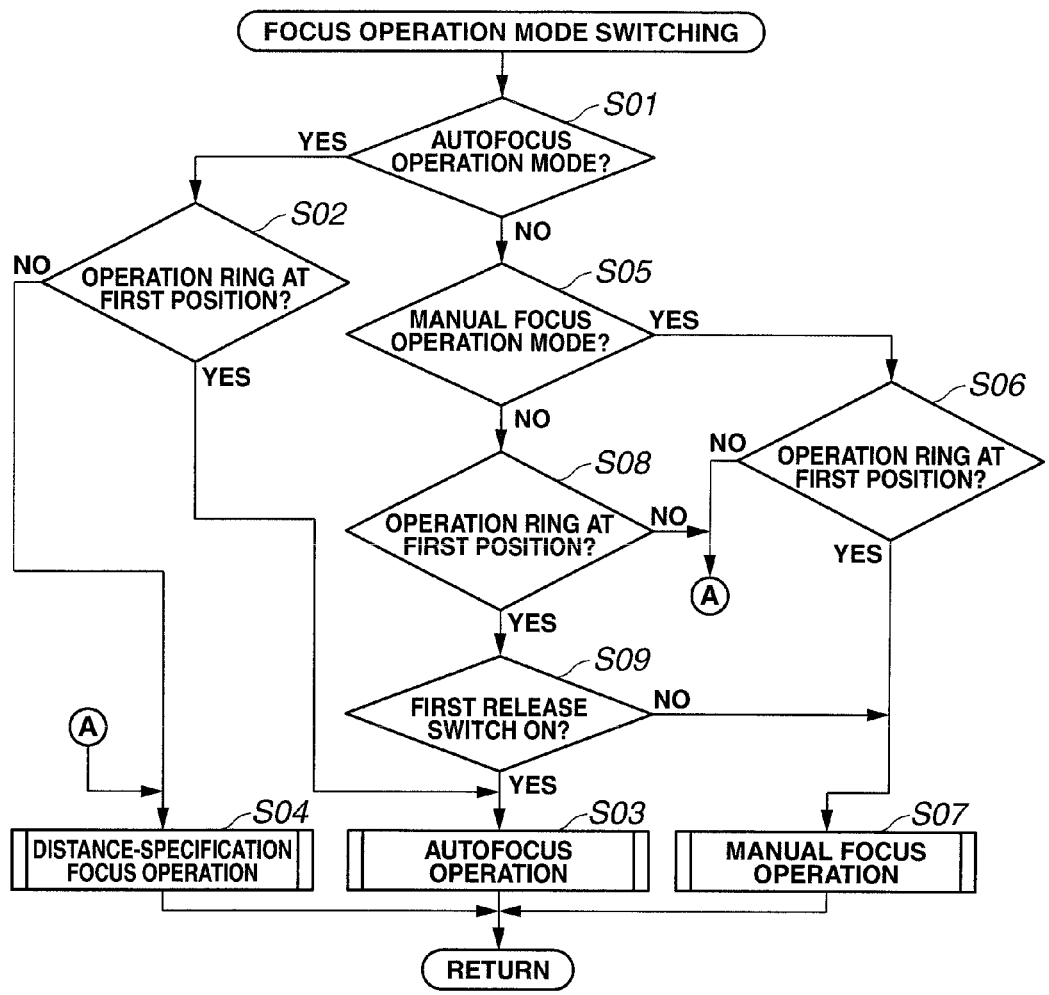
FIG. 11 is a flowchart of a focus operation mode switching subroutine.

In the camera system 1 of the present embodiment, when the camera body is in a state in which the power is turned on, a focus operation mode switching subroutine shown in FIG. 11 is repeatedly performed at a predetermined cycle by the camera body control portion 6. The focus operation mode switching subroutine is a subroutine for judging a focus operation mode that is selected by a user by input of an instruction from among a plurality of focus operation modes of the camera system 1, and switching the focus operation mode of the camera system 1 in accordance with the inputted instruction.

Note that the focus operation mode switching subroutine described hereunder is appropriately incorporated into a main routine for causing the camera system 1 to perform photographing operations. The main routine for causing the camera system 1 to perform photographing operations is the same as known technology, and hence a description thereof is omitted.

The camera according to the present embodiment has three modes as focus operation modes.

The first mode of the focus operation modes is the autofocus mode (automatic focus mode) for automatic focusing adjustment. When the operation ring 17 is at the first position in the autofocus mode, if it is detected that the first release switch 3a has entered the on state, regardless of whether or not the operation ring 17 has been subjected to a rotational operation by the user, the camera system 1 performs an autofocus operation that drives the focusing barrel 13 by means of the drive source 15c based on an output from the image pickup device 9 or an output from a focusing sensor portion that is different from the image pickup device 9. In this state, even if the operation ring 17 is rotated, the camera system 1 does not perform any operation.

Further, when the operation ring 17 is at the second position in the autofocus mode, if it is detected that the operation ring 17 has been rotated, the camera system 1 drives the focusing barrel 13 by means of the drive source 15c so as to focus in accordance with a numeric value of the distance display of the distance scale 18a that is indicated by the indicator 16a in accordance with an output of the second encoder portion 23. This operation is referred to as a distance-specification focus operation.

The second mode of the focus operation modes is the manual focus mode for performing focusing adjustment manually. When the operation ring 17 is at the first position in the manual focus mode, if the operation ring 17 is rotated, the camera system 1 performs a manual focus operation that drives the focusing barrel 13 by means of the drive source 15c in accordance with the rotational direction, the rotational amount, a rotational speed and the like of the operation ring 17 detected by the first encoder portion 21. As one example according to the present embodiment, in the manual focus operation, if the operation ring 17 is rotated in a counterclockwise direction as viewed from the rear, the focusing barrel 13 is driven by the drive source 15c so that the focusing distance changes to the infinity side, while if the operation ring 17 is rotated in a clockwise direction, the focusing barrel 13 is driven by the drive source 15c so that the focusing distance changes to the close side. Further, in the manual focus operation, a driving amount of the focusing barrel 13 is determined in accordance with the rotational amount of the operation ring 17, and a driving speed of the focusing barrel 13 is determined in accordance with the rotational speed of the operation ring 17. At the time of the manual focus operation, the user can observe a focusing state by viewing a live view image that is displayed on the image display apparatus 31 or the like.

Further, when the operation ring 17 is at the second position in the manual focus mode, the camera system 1 performs the aforementioned distance-specification focus operation.

The third mode of the focus operation modes is the focus operation automatic switching mode that performs an operation that combines the autofocus operation and the manual focus operation. In the focus operation automatic switching mode, when the operation ring 17 is at the first position, if it is detected that the first release switch 3a has entered the on state, similarly to the above described autofocus mode, the camera system 1 performs focusing by driving the focusing barrel 13 by means of the drive source 15c based on the output of the image pickup device 9 or the output from the focusing sensor portion that is different from the image pickup device 9. However, the focus operation automatic switching mode differs from the autofocus mode in the respect that if the operation ring 17 is rotated when the operation ring 17 is at the first position, similarly to the above described manual focus mode, the focusing barrel 13 is driven by the drive source 15c.

Further, when the operation ring 17 is at the second position in the focus operation automatic switching mode, the camera system 1 performs the aforementioned distance-specification focus operation.

Hereunder, the focus operation mode switching subroutine shown in FIG. 11 is described in detail. In the focus operation mode switching subroutine, first, in step S01, the camera body control portion 6 judges whether or not the focus operation mode that the user selected through the focus mode switching operation portion 5 is the autofocus operation mode. In this case, if the focus mode switching operation portion 5 is, for example, a dial switch, the camera body control portion 6 judges based on an output from the dial switch. Further, for example, if the focus mode switching operation portion 5 is constituted of a GUI, the camera body control portion 6 judges based on stored information that has been previously specified by the user.

If the result of the judgment in step S01 is that the autofocus operation mode is selected, the process shifts to step S02 to determine the position of the operation ring 17 in the optical axis O direction by means of the operation ring position detection means 22. That is, the operation ring position detection means 22 is used to detect whether the operation ring 17 is at the first position or at the second position. If it is judged in step S02 that the operation ring 17 is at the first position, the process advances to step S03 to perform the autofocus operation that is illustrated in FIG. 12.

Figure 12:
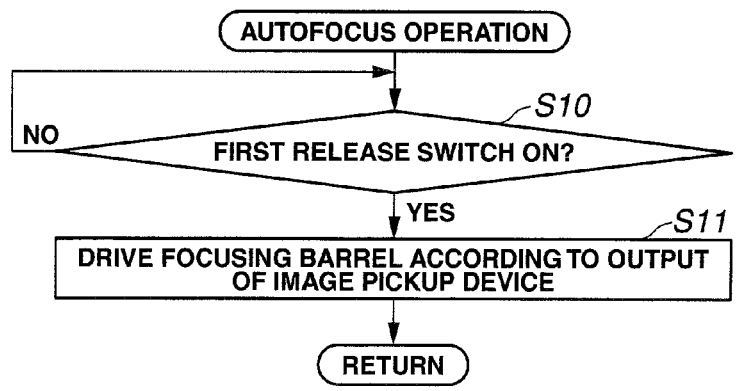
FIG. 12 is a flowchart of an autofocus operation subroutine.

In the camera system 1, although the timing to perform the autofocus operation is not particularly limited, as one example according to the present embodiment, as shown in a flowchart of FIG. 12, it is assumed that the autofocus operation is performed when the first release switch 3a enters the on state.

When the camera system 1 performs the autofocus operation, the camera body control portion 6 detects a contrast value of an object image based on a signal that is outputted from the image pickup device 9 being the autofocus sensor portion, and drives the focusing barrel 13 in the optical axis O direction so that the contrast value becomes a maximum value. Alternatively, the camera system 1 performs the autofocus operation based on an output from a sensor for autofocusing that adopts the phase difference method that is different from the image pickup device 9.

According to the camera system 1 that has a configuration in which the camera body 2 and the lens barrel 10 can be joined to and separated from (detachably attached to) each other as in the present embodiment, a command for driving the drive source 15c based on an output from the image pickup device 9 at the time of the autofocus operation is outputted from the camera body control portion 6. In this case, the lens barrel control portion 24 drives the drive source 15c in accordance with the command from the camera body control portion 6 that is inputted through the communication portion 25. The focus operation mode switching subroutine ends for the time being upon execution of step S03, and the process returns to a photographing main routine with respect to which a description is omitted here.

Note that, the camera system 1 may be of a form such that, when the autofocus operation mode is selected and the operation ring 17 is at the first position, performance of the autofocus operation is always continued irrespective of the state of the first release switch 3a.

In contrast, if the result of the judgment in step S02 is that the operation ring 17 is not at the first position, that is, when it is judged that the operation ring 17 is at the second position, the process advances to step S04 to perform the distance-specification focus operation, described later, that is illustrated in FIG. 14.

Furthermore, if the result of the judgment in step S01 is that the autofocus operation mode is not selected, the process shifts to step S05. In step S05, it is judged whether or not the manual focus mode is selected by the user by means of the focus mode switching operation portion 5 from among the plurality of focus operation modes of the camera system 1. If the result of the judgment in step S05 is that the manual focus mode is selected, the process advances to step S06.

In step S06, the operation ring position detection means 22 is used to detect whether the operation ring 17 is at the first position or at the second position. If the result of the judgment in step S06 is that the operation ring 17 is at the first position, the process advances to step S07 to perform the manual focus operation that is illustrated in FIG. 13.

In step S07, the camera system 1 executes a manual focus operation subroutine illustrated in FIG. 13. When the manual focus operation is performed, if the rotation of the operation ring 17 is detected by the first encoder portion 21 (step S20), the camera system 1 drives the focusing barrel 13 in accordance with the rotational direction, the rotational amount and the rotational speed of the operation ring 17 (step S21).

For example, in a case where it is detected that the operation ring 17 rotated in the clockwise direction when viewing the lens barrel 10 from the rear, the camera system 1 moves the focusing barrel 13 in a direction in which the focusing distance of the optical system member 11 becomes shorter. Further, for example, in a case where it is detected that the operation ring 17 rotated in the counterclockwise direction when viewing the lens barrel 10 from the rear, the camera system 1 moves the focusing barrel 13 in a direction in which the focusing distance of the optical system member 11 becomes longer. The movement distance and speed on the focusing barrel 13 in a manual focus operation is determined in accordance with a rotational amount (rotation angle) and a rotational speed (angular speed of rotation) of the operation ring 17 detected by the first encoder portion 21.

The manual focus operation illustrated in FIG. 13 is repeatedly executed until a focus operation other than the manual focus operation is selected by execution of the focus operation mode switching subroutine. That is, the manual focus operation illustrated in FIG. 13 is repeatedly executed until, for example, the autofocus operation mode is selected by means of the focus mode switching operation portion 5 or the operation ring 17 is moved from the first position to the second position.

Note that at the time of the manual focus operation of the camera system 1 of the present embodiment, the user can observe the focusing state by observing a state of an object image displayed on the image display apparatus 31 that is referred to as a so-called live view, and the user operates the operation ring 17 based on the observation result. Naturally, at the time of another focus operation also, the user can similarly observe the focusing state by observing the state of an object image displayed on the image display apparatus 31.

If the result of the judgment in step S06 is that the operation ring 17 is not at the first position, that is, when it is judged that the operation ring 17 is at the second position, the process advances to step S04 to perform the distance-specification focus operation, described later, that is illustrated in FIG. 14.

Further, in step S05, if it is judged that the manual focus mode is not selected by the user by means of the focus mode switching operation portion 5, it is judged that the selected mode is the focus operation automatic switching mode. Next, the process advances to step S08 to detect whether the operation ring 17 is at the first position or at the second position by means of the operation ring position detection means 22. If the result of the judgment in step S08 is that the operation ring 17 is not at the first position, that is, when it is judged that the operation ring 17 is at the second position, the process advances to step S04 to perform the distance-specification focus operation, described later, that is illustrated in FIG. 14.

In contrast, if the result of the judgment in step S08 is that the operation ring 17 is at the first position, the operation advances to step S09 to judge (monitor) whether or not the first release switch 3a is in the on state If the result of the judgment in step S09 is that the first release switch 3a is in the on state, the process advances to step S03 to perform the above described autofocus operation that is illustrated in FIG. 12. Further, if the result of the judgment in step S09 is that the first release switch 3*a* is not in the on state, the process advances to step S07 to perform the above described manual focus operation that is illustrated in FIG. 13.

Hereunder, the distance-specification focus operation in step S04 is described. The distance-specification focus operation is performed by a distance-specification focus operation subroutine illustrated in FIG. 14. In the distance-specification focus operation, the camera system 1 drives the focusing barrel 13 to a position that corresponds to a numeric value of a distance on the distance scale 18*a* that is calculated based on an output signal from the second encoder portion 23 and indicated by the indicator 16*a*.

Specifically, in the distance-specification focus operation, first, in step S30, the lens barrel control portion 24 reads an output value of the second encoder portion 23. The output value of the second encoder portion 23 is a value that represents an absolute rotational position around the optical axis O of the rotational member to be engaged 18 with respect to the base portion 12.

Next, in step S31, based on the output value of the second encoder portion 23, the lens barrel control portion 24 calculates a numeric value of the distance on the distance scale 18*a* that the indicator 16*a* indicates. Conversion to the numeric value of the distance on the distance scale 18*a* that the indicator 16*a* indicates on the basis of the output value of the second encoder portion 23 is performed, for example, based on a conversion table that is previously stored by the lens barrel control portion 24.

Next, in step S32, the lens barrel control portion 24 moves the focusing barrel 13 so that, based on the output value of the second encoder portion 23, the numeric value of the distance on the distance scale 18*a* that the indicator 16*a* indicates and a focusing distance of the optical system member 11 match or are in proximity to each other. For example, if the numeric value of the distance on the distance scale 18*a* that the indicator 16*a* indicates is 3 meters, the lens barrel control portion 24 moves the focusing barrel 13 so that the focusing distance of the optical system member 11 becomes 3 meters. Thereafter, the process returns to step S01 Note that a form may also be adopted in which the operations from steps S30 to S32 are performed not just by the lens barrel control portion 24, but are performed by the lens barrel control portion 24 in conjunction with the camera body control portion 6.

Note that in the distance-specification focus operation, although it is ideal that the numeric value of the distance on the distance scale 18*a* that the indicator 16*a* indicates and the focusing distance of the optical system member 11 match, since it is difficult to match the aforementioned numeric value and focusing distance in a case where the resolution of the second encoder portion 23 is low, the focusing barrel 13 is moved so that the numeric value and focusing distance are in proximity to each other.

The lens barrel control portion 24 outputs the calculated numeric value of the distance on the distance scale 18*a* that the indicator 16*a* indicates to the camera body control portion 6 of the camera body 2 through the communication portion 25. The camera body control portion 6 determines an exposure value in accordance with the numeric value that is received, and adds the numeric value to a photographed image as metadata.

The distance-specification focus operation illustrated in FIG. 14 is repeatedly executed until a focus operation other than the distance-specification focus operation is selected by execution of the focus operation mode switching subroutine. That is, the distance-specification focus operation illustrated in FIG. 14 is repeatedly executed until the autofocus operation mode is selected by means of the focus mode switching operation portion 5 or the operation ring 17 is moved from the second position to the first position.

FIG. 15 is a table that summarizes switching of the autofocus operation, the manual focus operation and the distance-specification focus operation that is determined according to the position of the operation ring 17 in the optical axis O direction and the selection state of the focus operation mode in the above described camera system 1.

As shown in FIG. 15, in a case where the manual focus mode is selected as the focus operation mode of the camera system 1 and the operation ring 17 is at the first position, when the operation ring 17 is rotated, the manual focus operation is performed in which the focusing barrel 13 is driven in accordance with the rotation of the operation ring 17. On the other hand, in a case where the manual focus mode is selected as the focus operation mode of the camera system 1 and the operation ring 17 is at the second position, the distance-specification focus operation is performed in which the focusing barrel 13 is driven so as to focus at a distance that the indicator 16*a* indicates.

Further, in a case where the autofocus mode is selected as the focus operation mode of the camera system 1 and the operation ring 17 is at the first position, the autofocus operation is performed that does not drive the focusing barrel 13 even if the operation ring 17 is rotated, but drives the focusing barrel 13 based on an output from the image pickup device 9 when the first release switch 3*a* enters the on state. In contrast, in a case where the autofocus mode is selected as the focus operation mode of the camera system 1 and the operation ring 17 is at the second position, the distance-specification focus operation is performed in which the focusing barrel 13 is driven so as to focus at a distance that the indicator 16*a* indicates.

Furthermore, in a case where the focus operation automatic switching mode is selected as the focus operation mode of the camera system 1 and the operation ring 17 is at the first position, the autofocus operation is performed if the first release switch 3*a* enters the on state, and the manual focus operation is performed if the operation ring 17 is rotated. On the other hand, in a case where the focus operation automatic switching mode is selected as the focus operation mode of the camera system 1 and the operation ring 17 is at the second position, the distance-specification focus operation is performed in which the focusing barrel 13 is driven so as to focus at a distance that the indicator 16*a* indicates.

As described above, the camera system 1 of the present embodiment includes the indicator 16*a* that is arranged at a fixed position with respect to the base portion 12 that is fixed to the camera body 2, the rotational member to be engaged 18 having the distance scale 18*a* that is arranged so as to be rotatable with respect to the base portion 12, the second encoder portion 23 that detects a rotational position of the rotational member to be engaged 18 with respect to the base portion 12, and the rotational member to be engaged 18 that can rotate together with the operation ring 17.

At the time of an autofocus operation, the camera system 1 of the present embodiment performs focusing control based on an output of the image pickup device 9 that is a focusing sensor portion, regardless of the rotational position of the rotational member to be engaged 18. Further, at the time of a distance-specification focus operation, the camera system 1 drives the focusing barrel 13 to a position that corresponds to a numeric value of a distance on the distance scale 18*a* that the indicator 16*a* indicates, the distance scale 18*a* being calculated based on an output signal of the second encoder portion 23. That is, in the camera system 1, manual focusing the distance scale is possible. Further, the user can switch between an autofocus operation and a distance-specification focus operation in the camera system 1 by operating the focus mode switching operation portion 5 and the operation ring 17.

According to the lens barrel 10 of the camera system 1 having the above described configuration, the only member that the drive portion 15 drives is the focusing barrel 13 that holds the focusing lens 11*a*, and thus the camera system 1 can be provided in which the number of members driven by the drive portion 15 is decreased and which is lightweight. Thus, according to the present embodiment, the drive portion 15 can be made a small member with a small output, and the lens barrel 10 can be miniaturized. Further, focus operations can be performed rapidly.

In addition, according to the present embodiment, a mechanism that transmits a motive force for driving the rotational member to be engaged 18 is not required, and a motive force can be transmitted from the drive portion 15 to the focusing barrel 13 as a member to be driven with a simple configuration that has few component parts. Consequently, it is easy to reduce the volume of sound generated when driving the focusing barrel 13 to perform focusing control. Suppressing the sound volume generated at a time of focusing control is preferable, for example, when shooting a moving image.

Further, according to the present embodiment, in a case where the manual focus operation mode is selected by the focus mode switching operation portion 5 and the operation ring 17 is positioned at the second position, manual focus using the distance scale is possible. Therefore, according to the present embodiment, a photographing technique can be executed in which the focusing distance is previously set manually to a predetermined focusing distance using the distance scale 18*a* and photographing is performed rapidly without performing a focusing control operation.

For example, according to the present embodiment, because the depth-of-field indicator 16*b* is provided on the indicator display barrel 16, a user can immediately confirm a focusing object distance by looking at the distance scale 18*a*, the indicator 16*a* and the depth-of-field indicator 16*b* that are exposed on the outer circumferential portion of the lens barrel 10.

On the other hand, according to the present embodiment, in a case where the manual focus operation mode is selected by means of the focus mode switching operation portion 5 and the operation ring 17 is positioned at the first position, it is possible to perform manual focusing as illustrated in FIG. 13 in which focusing control is performed in accordance with rotation of the operation ring 17. In the manual focus operation, since the operation ring 17 is not engaged with the rotational member to be engaged 18, the operation ring 17 can rotate without limitation around the optical axis O, and focusing control of the optical system member 11 is performed in accordance with the rotational amount of the operation ring 17.

Therefore, in a manual focus operation of the camera system 1 of the present embodiment, focusing control can be performed that is finer than in a distance-specification focus operation using the distance scale.

As described above, according to the camera system 1 of the present embodiment it is possible to selectively execute a distance-specification focus operation in which rapid photographing is realized as a result of the focusing distance and the depth of field being clearly indicated by means of the indicator 16*a* and the distance scale 18*a* as rough focusing control (coarse control) through the drive portion 15, and a manual focus operation that performs fine focusing control (fine control) through the drive portion 15 according to the rotational amount of the operation ring 17. Further, since it is possible to switch between a distance-specification focus operation and a manual focus operation by merely moving the operation ring 17 back and forth, the switching can be executed rapidly.

Note that focusing control of course can also be performed even in a distance-specification focus operation if the resolution of the second encoder portion 23 is sufficiently high. Further, a distance-specification focus operation may be referred to as an "absolute focus operation" and a manual focus operation may be referred to as a "relative focus operation".

Furthermore, according to the present embodiment, in a case where the operation ring 17 is positioned at the first position, since the operation ring 17 and the rotational member to be engaged 18 are not engaged, the rotational member to be engaged 18 does not rotate even if the operation ring 17 rotates. Therefore, a distance display of the rotational member to be engaged 18 that has been set at the time of a distance-specification focus operation is not changed at the time of a manual focus operation.

For example, after the user rotates the rotational member to be engaged 18 so that the focusing distance becomes 3 meters at the time of a distance-specification focus operation, even if the operation ring 17 is moved to the first position and focusing control by a manual focus operation is performed, the rotational member to be engaged 18 does not rotate. Hence, in a case where, thereafter, the user moves the operation ring 17 to the second position to perform a distance-specification focus operation, the focusing distance of the optical system member 11 returns to 3 meters. Accordingly, by previously setting the focusing distance to a value that is desired at the time of a distance-specification focus operation, photographing with a desired focusing distance can be quickly performed by merely moving the operation ring 17 rearward from a state in which a manual focus operation is being performed.

As described above, in the camera system 1 of the present embodiment, it is possible to perform autofocusing and manual focusing, and a focus operation with respect to an object can be rapidly performed.

Second Embodiment

Hereunder, a second embodiment of the present invention is described. In the following, only differences with respect to the first embodiment are described, and components that are the same as in the first embodiment are denoted by the same reference symbols and descriptions of such components are appropriately omitted.

Figure 16:
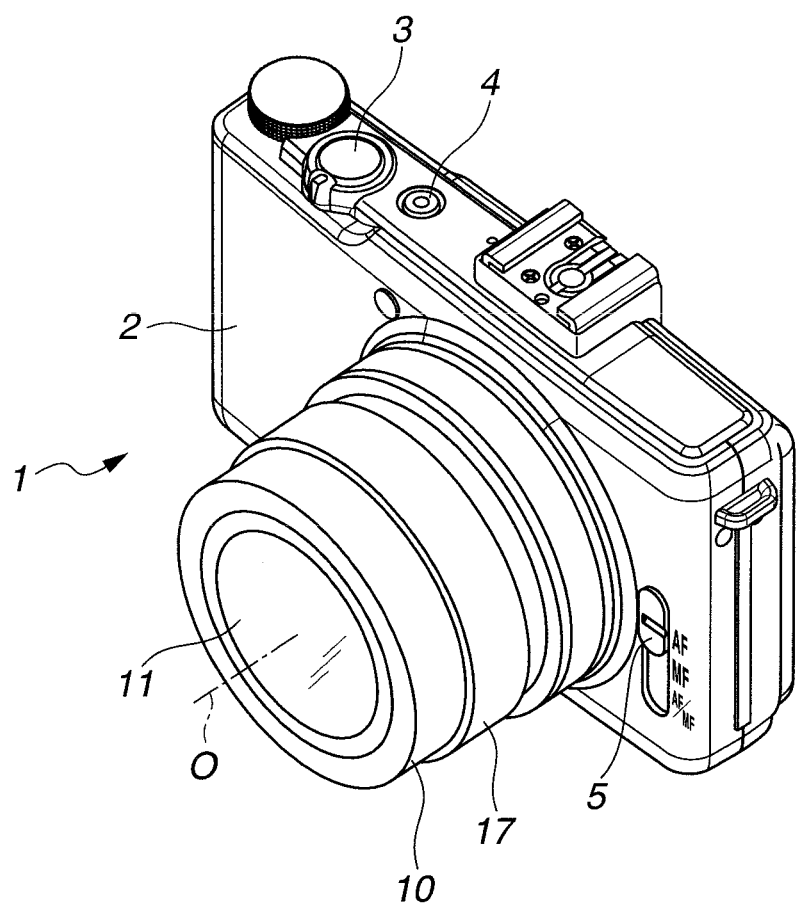
FIG. 16 is a perspective view showing a front face side of a camera constituting a camera system according to a second embodiment.

As shown in FIG. 16, a camera system 1 of the present embodiment includes a camera body 2 and a lens barrel 10 that are integrally formed and cannot be detached and attached with respect to each other. In the camera system 1 in which the camera body 2 and the lens barrel 10 are integrated into a single body as in the present embodiment, it is not necessary to arrange an electric circuit and the like that constitutes a control portion in both of the camera body 2 and the lens barrel 10.

Figure 17:
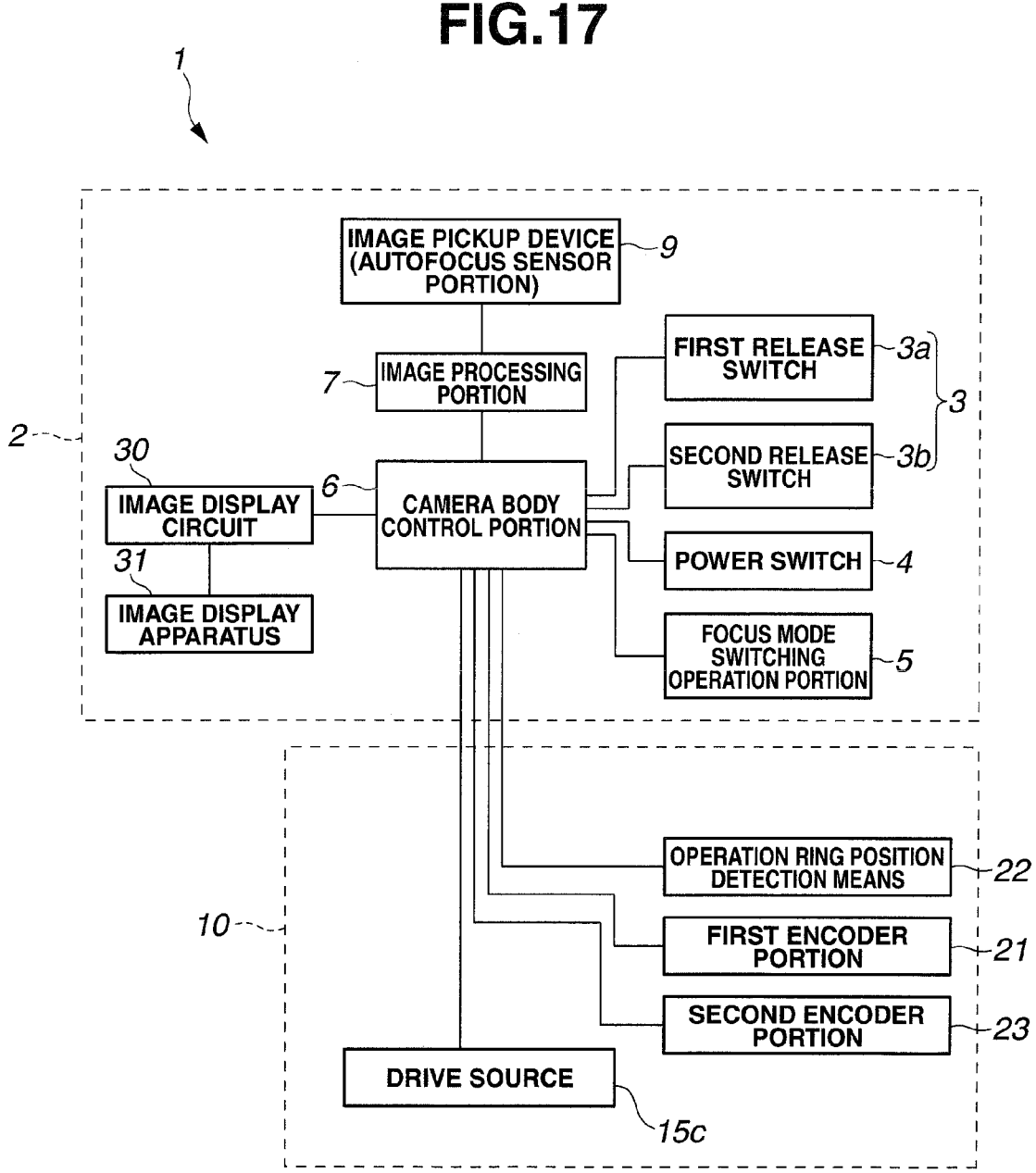
FIG. 17 is a block diagram of an electric circuit involved in focus operations of the camera system according to the second embodiment.

As shown in FIG. 17, according to the present embodiment, the control portion is constituted of only the camera body control portion 6 that is arranged in the camera body 2. The camera body control portion 6 is configured to be capable of additionally executing the control that the lens barrel control portion performs in the first embodiment. The remaining configuration and operations of the camera system 1 of the present embodiment are substantially the same as in the first embodiment except that the communication portion 8 and the communication portion 25 of the first embodiment are omitted from the present embodiment, and the configuration is one in which an image processing portion 7, a release switch 3 including a first release switch 3a and a second release switch 3b, a power switch 4, a focus mode switching operation portion 5, an operation ring position detection portion 22, a first encoder portion 21, a second encoder portion 23, a drive source 15c and an image display circuit 30 are electrically connected to the camera body control portion 6. Accordingly, the camera system 1 of the present embodiment can obtain similar advantageous effects as those of the first embodiment.

Third Embodiment

Hereunder, a third embodiment of the present invention is described. A focus operation mode switching subroutine is different in the third embodiment compared to the first embodiment. In the following, only differences with respect to the first embodiment are described, and components that are the same as those in the first embodiment are denoted by the same reference symbols and descriptions of such components are appropriately omitted.

Figure 18:
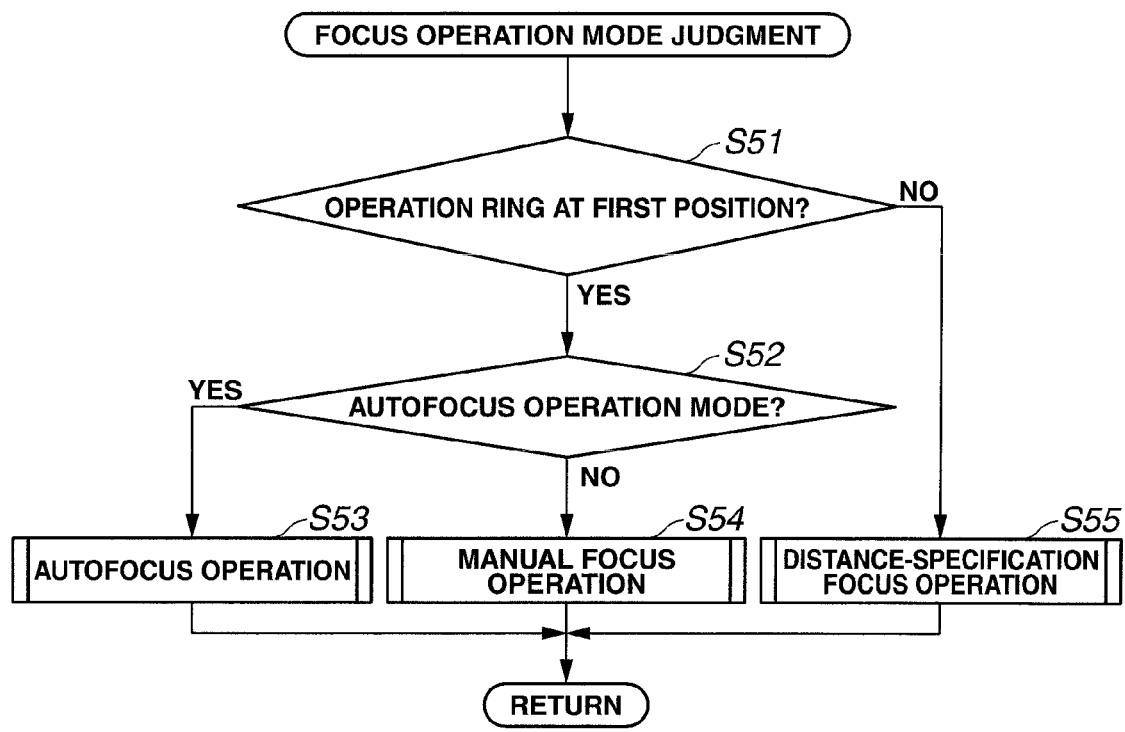
FIG. 18 is a flowchart of a focus operation mode switching subroutine of a camera system according to a third embodiment.

FIG. 18 is a flowchart of a focus operation mode switching subroutine of the camera system according to the fifth embodiment. Note that, the focus operation mode switching subroutine described hereunder is appropriately incorporated into a main routine for causing the camera system 1 to perform photographing operations. The main routine for causing the camera system 1 to perform photographing operations is the same as known technology, and hence a description thereof is omitted.

According to the present embodiment, first, in step S51, it is judged whether or not the operation ring 17 is present at the first position based on an output signal of the operation ring position detection portion 22. If the result of the judgment in step S51 is that the operation ring 17 is not present at the first position, the process shifts to step S55, and a distance-specification focus operation as shown in FIG. 14 is performed.

In contrast, if the result of the judgment in step S51 is that the operation ring 17 is present at the first position, the process shifts to step S52. In step S52, it is judged whether or not the focus operation mode that the user selected through the focus mode switching operation portion 5 is the autofocus operation mode.

If the result of the judgment in step S52 is that the autofocus operation mode is selected, the process shifts to step S53, and an autofocus operation as shown in FIG. 12 is performed. In contrast, if the result of the judgment in step S52 is that the autofocus operation mode has not been selected, a manual focus operation as shown in FIG. 13 is performed.

As described above, according to the focus operation mode switching subroutine of the present embodiment, first, a judgment is made to determine which position among the first position and the second position the operation ring 17 is positioned at. Consequently, when the operation ring 17 is positioned at the second position, the distance-specification focus operation is executed.

Therefore, according to the camera system 1 of the present embodiment, regardless of whether a focus operation mode that is selected by the user through the focus mode switching operation portion 5 is the autofocus operation mode or the manual focus operation mode, if the operation ring 17 is positioned at the second position a distance-specification focus operation is performed.

That is, according to the present embodiment, when the user moves the operation ring 17 to the second position, the camera system 1 always executes a distance-specification focus operation. Therefore, according to the present embodiment, it is possible to immediately switch from a state in which an autofocus operation is being performed to a distance-specification focus operation that uses the distance scale.

Further, as described in the above embodiments, when the operation ring 17 is positioned at the first position, the operation ring 17 and the rotational member to be engaged 18 are not engaged, and the rotational member to be engaged 18 does not rotate even if the operation ring 17 rotates.

For example, if the focusing distance is set to 3 meters when the operation ring 17 is positioned at the second position, and thereafter the operation ring 17 is temporarily moved to the first position and subsequently returned to the second position, the focusing distance becomes 3 meters irrespective of whether or not the operation ring 17 was rotated and whether or not an autofocus operation was performed at the first position.

Therefore, in a case where the operation ring 17 is positioned at the second position, based on the display of the depth-of-field indicator 16b, if the focusing distance is set in advance so that a photographing technique that is referred to as a so-called "pan-focus" can be performed, it is possible to rapidly switch from a state in which an autofocus operation or a manual focus operation is being performed to a state of performing pan-focus photographing by merely moving the operation ring 17 to the second position. Thus, the convenience for the user is enhanced. Conversely, it is also possible to rapidly switch from a state in which pan-focus photographing is being performed at the time of a distance-specification focus operation to a state of performing an autofocus operation or a manual focus operation by merely moving the operation ring 17 to the first position.

Further, as described in the first embodiment, according to the present embodiment also, the number of members driven by the drive portion 15 can be reduced and the camera system can be made lightweight. Thus, according to the present embodiment, the drive portion 15 can be made a small member with a small output, and the lens barrel 10 can be made compact in size. Further, the focus operations can be rapidly performed.

Note that, although in the above described embodiments the distance scale 18a is displayed on the rotational member to be engaged 18 of the lens barrel 10, and the indicator 16a is provided on the fixed member 16, conversely, a configuration may also be adopted in which a distance scale is displayed on the fixed member 16 and an indicator is provided on the rotational member to be engaged 18.

The present invention is not limited to the above described embodiments, but may be suitably changed without departing from the spirit or concept of the invention readable from the appended claims and the entire specification, and a camera system and a lens barrel with such changes are also included in the technical scope of the present invention.

What is claimed is:

1. A camera system, comprising:
a fixed member;
a drive source;
a focusing lens;
a drive portion that is driven by the drive source, and that drives the focusing lens in an optical axis direction;
a rotational member to be engaged that is rotatable around an optical axis;
an operation ring that can be positioned at a first position and a second position in the optical axis direction, and that is capable of rotation around the optical axis at each of the first position and the second position for driving the focusing lens in the optical axis direction;

operation ring position detection means that detects whether the operation ring is at the first position or at the second position;

engagement means that, when the operation ring is at the second position, causes the rotational member to be engaged and the operation ring to engage with each other and rotates the rotational member to be engaged accompanying rotation of the operation ring, and when the operation ring is at the first position, disengages the rotational member to be engaged and the operation ring from each other so that the rotational member to be engaged does not rotate even if the operation ring rotates; and control means that, when it is detected by the operation ring position detection means that the operation ring is at the first position, and when the operation ring is rotated, drives the focusing lens to an arbitrary position by means of the drive portion in accordance with the rotation, and when it is detected by the operation ring position detection means that the operation ring is at the second position, drivingly controls the focusing lens by means of the drive portion in accordance with a relative movement position between the rotational member to be engaged and the fixed member.

2. The camera system according to claim 1, further comprising switch means for performing autofocusing,
wherein when the operation ring is at the first position and there is an output from the switch means, the control means drives the focusing lens to an in-focus position.

3. The camera system according to claim 1, wherein one of an indicator and a distance scale is displayed on the fixed member, and the other of the indicator and the distance scale is displayed on the operation ring.

4. The camera system according to claim 2, wherein one of an indicator and a distance scale is displayed on the fixed member, and the other of the indicator and the distance scale is displayed on the operation ring.

5. The camera system according to claim 3, wherein the fixed member displays at least one pair of diaphragm values of an identical numeric value between which the indicator is interposed.

6. The camera system according to claim 4, wherein the fixed member displays at least one pair of diaphragm values of an identical numeric value between which the indicator is interposed.

7. The camera system according to claim 1, wherein the lens barrel is an interchangeable lens that can be detachably attached to the camera.

* * * * *